United States Patent [19]
Hylton et al.

[11] Patent Number: 5,630,204
[45] Date of Patent: May 13, 1997

[54] CUSTOMER PREMISE WIRELESS DISTRIBUTION OF BROAD BAND SIGNALS AND TWO-WAY COMMUNICATION OF CONTROL SIGNALS OVER POWER LINES

[75] Inventors: Denny L. Hylton, Fairfax County, Va.; Steven Olsen, Baltimore, Md.; William Burton, Montgomery County, Md.; Dave Lichtenwalner, Howard County, Md.

[73] Assignee: Bell Atlantic Network Services, Inc., Arlington, Va.

[21] Appl. No.: 508,345

[22] Filed: Jul. 27, 1995

Related U.S. Application Data

[63] Continuation-in-part of Ser. No. 431,940, May 1, 1995, and Ser. No. 508,131, Jul. 27, 1995.

[51] Int. Cl.⁶ .................................................. H04N 7/173
[52] U.S. Cl. .................... 455/3.3; 455/4.2; 455/5.1; 348/6; 348/8; 348/7; 348/12; 370/342; 340/310.06
[58] Field of Search ............... 455/3.1, 4.2, 5.1, 455/6.3, 3.3, 3.2, 66; 348/8, 12, 13, 10, 6, 7; 370/110.1, 95.1, 95.3, 85.1, 85.2, 85.3, 124, 73, 18, 19, 21; 375/205; 340/310.01, 310.02, 310.03, 310.04, 310.05, 310.06, 310.07, 310.08; H04N 7/16, 7/173

[56] References Cited

U.S. PATENT DOCUMENTS

| | | | |
|---|---|---|---|
| 4,429,299 | 1/1984 | Kabat et al. | 340/310 R |
| 4,506,387 | 3/1985 | Walter . | |
| 4,509,211 | 4/1985 | Robbins . | |
| 4,882,747 | 11/1989 | Williams . | |
| 4,885,766 | 12/1989 | Yasuoka et al. . | |
| 4,899,370 | 2/1990 | Kameo et al. . | |
| 4,916,532 | 4/1990 | Streck et al. . | |
| 4,949,187 | 8/1990 | Cohen . | |
| 4,963,995 | 10/1990 | Lang . | |
| 4,973,940 | 11/1990 | Sakai et al. | 455/3.4 |
| 5,010,399 | 4/1991 | Goodman . | |
| 5,012,350 | 4/1991 | Streck et al. . | |
| 5,023,931 | 6/1991 | Streck et al. . | |
| 5,027,400 | 6/1991 | Baji et al. . | |
| 5,057,932 | 10/1991 | Lang . | |
| 5,130,792 | 7/1992 | Tindell et al. . | |
| 5,132,992 | 7/1992 | Yurt et al. . | |
| 5,133,079 | 7/1992 | Ballantyne . | |
| 5,140,610 | 8/1992 | Holliday et al. | 375/1 |
| 5,177,604 | 1/1993 | Martinez | 358/86 |
| 5,247,347 | 9/1993 | Litteral et al. . | |
| 5,253,275 | 10/1993 | Yurt et al. . | |
| 5,442,625 | 8/1995 | Gitlin et al. | 370/18 |
| 5,463,656 | 10/1995 | Polivka et al. | 375/200 |
| 5,499,236 | 3/1996 | Giallorenzi et al. | 370/18 |
| 5,504,454 | 4/1996 | Daggett et al. | 329/304 |

*Primary Examiner*—John K. Peng
*Assistant Examiner*—Chris Grant
*Attorney, Agent, or Firm*—Lowe, Price, LeBlanc & Becker

[57] ABSTRACT

A system and method for providing interactive multimedia services to subscriber premises utilizing wireless and power line distribution within the subscriber premise. The service is provided via a communications link delivering to the subscriber premises broad band digital information including video and audio from a plurality of information providers and control signals in a multiplexed form. This multiplexed signal is then separated and processed on premise and distributed in a two-way fashion using frequency hopping code division multiple access (CDMA) spread spectrum using radio frequency signals preferably at UHF for the broadband downstream signal and power line carrier for the control signaling.

21 Claims, 15 Drawing Sheets

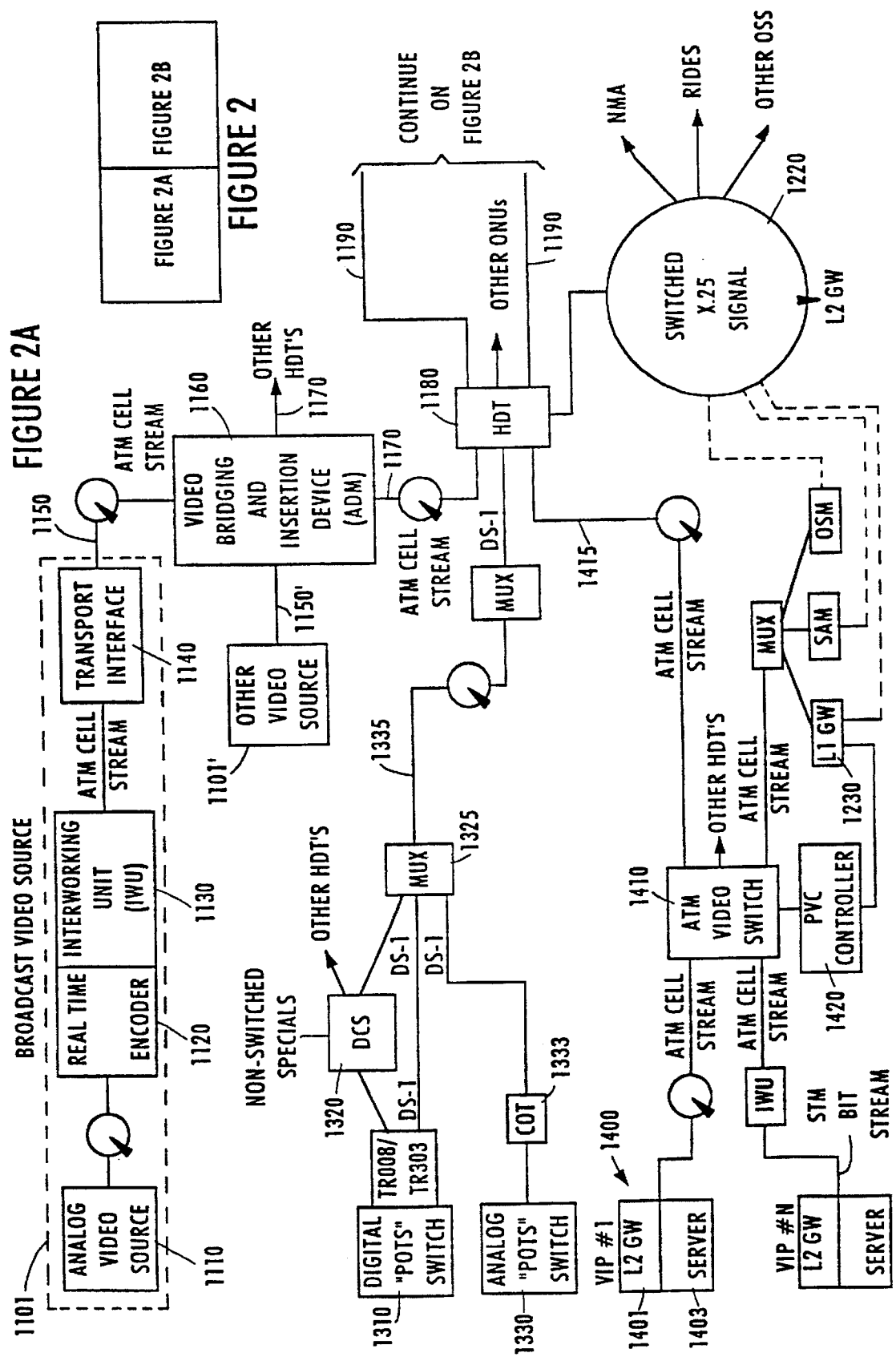

5,630,204

CUSTOMER PREMISE WIRELESS DISTRIBUTION OF BROAD BAND SIGNALS AND TWO-WAY COMMUNICATION OF CONTROL SIGNALS OVER POWER LINES

RELATED APPLICATIONS

This application is a Continuation-In-Part of application Ser. No. 08/431,940, filed on May 1, 1995, Attorney Reference No. 680-102, and application Ser. No. 08/508,131, filed on Jul. 27, 1995, Attorney Reference No. 680-102A.

TECHNICAL FIELD

The present invention relates to routing and access control and billing functionalities in video distribution networks capable of providing subscribers with access to multiple information service providers utilizing wireless distribution in at least a portion of the network.

BACKGROUND ART

Distribution of full motion video data has evolved from early television broadcasting to meet viewer demand. Earliest video distribution was by point-to-point wiring between a camera and a video monitor. This was followed by scheduled television broadcasting of programming over the public air waves. In the 1960s, Community Antenna Television (CATV) was chartered to provide off-air television signals to viewers in broadcast reception fringe areas. Later, under FCC regulation, the CATV industry was required to provide local access and original programming in addition to off-air broadcast signal distribution.

In response, several sources of cable network programming were established. Because of the wide bandwidth available on cable television systems, additional channels were available for the new programming. However, programming was generally prescheduled, with the viewer left to tune to the designated channel at the appointed time to view a particular program.

To increase revenues, cable television systems have initiated distribution of premium channels viewable only by subscribers having appropriate descramblers. The subscriber tunes the descrambler to receive a premium channel, descramble the video and audio information and supply a signal capable of reception on a standard television set. Pay-per-view programs, which evolved later, include recently released movies, live concerts and popular sporting events. Subscribers wishing to view a pay-per-view program place an order with the cable operator. At the designated time, the subscriber's descrambler is activated by some control from the cable operator to permit viewing of the pay-per-view programming. However, the subscriber is still restricted to viewing the programming at the scheduled time. There is no capability of delivering programming to a subscriber on demand, that is, immediately or at a subscriber-specified time and date.

More recently, several different wideband digital distribution networks have been proposed for offering subscribers an array of video services, including true Video On Demand service. The following U.S. Pat. Nos. disclose representative examples of such digital video distributions networks: U.S. Pat. No. 5,253,275 to Yurt et al., U.S. Pat. No. 5,132,992 to Yurt et al., U.S. Pat. No. 5,133,079 to Ballantyne et al., U.S. Pat. No. 5,130,792 to Tindell et al., U.S. Pat. No. 5,057,932 to Lang, U.S. Pat. No. 4,963,995 to Lang, U.S. Pat. No. 4,949,187 to Cohen, U.S. Pat. No. 5,027,400 to Baji et al., and U.S. Pat. No. 4,506,387 to Walter. In particular, Litteral et al. U.S. Pat. No. 5,247,347 discloses a digital video distribution network providing subscribers with access to multiple Video On Demand service providers through the public switched telephone network, as described in more detail below.

U.S. Pat. No. 5,247,347 to Litteral et al., the disclosure of which is hereby incorporated in its entirety into this disclosure by reference, discloses an enhanced public switched telephone network which also provides a video on demand service to subscribers over the public switched telephone network. A menu of video programming information is displayed at the subscriber's premises by a set-top terminal and a TV set. The subscriber may transmit ordering information via the public switched telephone network to the independent video information providers. Video programming may be accessed and transmitted to the subscriber directly from a video information provider (VIP) or through a video buffer located at a central office (CO) serving the subscriber.

Connectivity between the central office and the subscriber for transmission of video data is provided by an asymmetrical digital subscriber line (ADSL) system. ADSL interface units at the central office multiplex digital video information with voice information to be transmitted to the subscriber and support two-way transmission between the subscriber's line and the X.25 packet data network of one or more control channels. A complimentary ADSL interface unit at the subscriber's premises separates downstream video control signals and voice telephone signals from the line and multiplexes upstream control signals and voice telephone signals onto the line.

A subscriber can request transmission of video data using a telephone instrument by dialing a Voice Response Unit (VRU) of a video gateway device, through the voice telephone switch and dialing in selection information. Alternatively, the user can access the video gateway device and select a video using a remote control device, the set-top terminal and the control signaling channel through the network. The VIP's equipment identifies the requested title and determines if the title is available.

If the title is found, the corresponding data file is opened and a reserve idle communications port is identified for transmission of the video data to an input node of a digital cross-connect switch (DCS). The video data file is transmitted from the VIP's video storage device, through the DCS, to the designated ADSL interfaces for transmission to the requesting subscriber's premises. The ADSL interface on the subscriber premises demultiplexes the broadband program transmission off of the subscriber loop and applies the digital data stream to a decoder unit in the set-top terminal. The decoder unit decompresses the audio and video data, and converts the digital audio and video to corresponding analog signals. The decoder can supply baseband analog audio and video signals to a television receiver, or these analog signals can be modulated to a standard television channel frequency for use by the television receiver.

While the foregoing patents deal with systems involving wired distribution of the data, entertainment and information within the consumer premises, a number of patents have proposed various schemes for wireless distribution of information of one sort or another.

Robbins U.S. Pat. No. 4,509,211, issued Apr. 2, 1985, describes an electrical system that utilizes an extended infrared radiation link for remote control, such as a TV selector or for data communication.

Williams U.S. Pat. No. 4,882,747, issued Nov. 21, 1989, describes a teleconferencing system including infrared communication apparatus that provides simultaneous video control at a number of remote teleconferencing sites from a central teleconferencing location.

Yasuoka et al. U.S. Pat. No. 4,885,766, issued Dec. 5, 1989, describes a tele-controller system including a control device that receives and stores incoming commands transmitted through a telephone line. The commands are used to operate various apparatuses such as VCR, air conditioner, lamp, etc., at pre-determined times.

Kameo et al. U.S. Pat. No. 4,899,370 issued Feb. 6, 1990, describes an apparatus enabling remote control of electronic equipment such as a VCR through the use of a remote telephone set. A remote controller will provide wireless, line of sight operation of the VCR in response to a signal from the telephone set.

Streck et al. U.S. Pat. Nos. 4,916,532, 5,012,350 and 5,023,931, issued Apr. 10, 1990, Apr. 30, 1991, and Jun. 11, 1991, respectively, describe the transmission of a wireless signal from a VCR to a TV. The output of the VCR is fed into a transmitter and sent to the TV receiver. These patents also describe several prior art arrangements for transmitting a signal from a VCR to a TV set without linking wiring.

Goodman U.S. Pat. No. 5,010,399, issued Apr. 23, 1991, describes a premise video transmission system which uses existing premise telephone wiring to permit transmitting video across the premise without requiring installation of new wires. The patent describes the use of such telephone wiring for transmitting video and control signals without interference with telephone communications. The patent includes a background discussion of prior patents dealing with the problem and points out that not only telephone lines but power lines have been proposed as transmission conduits. However, the patent states that transmission across power wiring is very difficult and, in light of these difficulties, the Goodman patent proposes the use of telephone wiring. The Goodman patent is herein incorporated by reference.

The above discussed media distribution systems provide varied approaches to providing to business and residential premises numerous media services via different types of delivery mechanisms. However, all systems known to have been proposed to date have required a greater or lesser installation of additional signal distribution wiring or cabling in the served premise. In many instances, the installation of such facilities involves a major construction project and significant expense.

DISCLOSURE OF THE INVENTION

The principal object of the present invention is to provide an efficient system and method for providing wireless distribution of video and the like wide band information services throughout a premise.

According to the present invention, interactive multimedia services are provided to subscriber premises by any suitable multimedia distribution and delivery system and then distributed through the subscriber premises through a wireless distribution system particularly adapted to avoid interference from wireless distribution systems which may be utilized in adjoining or nearby premises of a different subscriber to the same or a different service.

Another object of the invention is to provide an efficient system and method for providing wireless distribution of video and the like wide band information services throughout a premise while utilizing the existing premise power lines to distribute two-way signaling related to the wide band information services.

In an exemplary implementation of the present invention, real time encoders receive video programs and encode the information for those programs into packets of compressed digital data, e.g., in accord with the recognized video compression standard. The head end may also receive previously encoded video program material from other sources, such as a digital server or a digital transmission media. Multiplexers combine digital data for groups of programs into the multiplexed packet data streams. A digital modulator, such as a 64 or 256 QAM modulator, modulates each digitally multiplexed packet data stream for transport in one unique channel. A combined spectrum signal containing these channels is delivered to the subscribers premise through any suitable multimedia distribution and delivery architecture.

The combined spectrum signal containing the above-described channels is connected to a network interface at the subscriber premises where it is up-converted to place the channels into available frequency channels, preferably in the UHF range. The unique channel from each digital modulator is fed to an up-converter synthesizer module which performs a frequency hopping spread spectrum technique. The frequency synthesizer uses an input frequency hopping spreading code to determine the particular frequency from within the set of frequencies in the broad frequency band at which to periodically generate the carrier wave. Frequency hopping codes are input to the frequency synthesizer by a frequency hopping code generator so that the carrier wave is frequency hopped. Each carrier is assigned a different spreading code so that each occupies a different channel during the same time period. The spreading codes are preferably orthogonal to one another so that cross-correlation between the spreading codes is approximately zero. The signals are fed to a suitable miniature subscriber premise antenna for radiation throughout the premises.

At the receiver site within the premise a similar antenna receives a signal which is then down-converted and supplied to a wireless signal processor. The wireless signal processor, typically part of an interface module connected by a cable to the down-converter, processes the received wireless signal to select one of the channels. The wireless signal processor effectively acquires a digital multiplexed data stream from the selected channel and supplies that data stream to a digital signal processor.

The digital signal processor selects packets of data relating to a selected one of the programs. The digital processing section processes the compressed, digitized data from those packets to produce signals presentable to the subscriber. In the preferred embodiment, the digital signal processor produces signals to drive a standard television set.

Particular transmitted signals are retrieved from the combined transmitted signal by despreading with a frequency hopping spreading code corresponding to the code for the particular transmitter antenna which is to be retrieved. As will be understood by those skilled in the art the transmitting and receiving codes are synchronized. When the spreading codes are orthogonal to one another, the received signal can be correlated with a particular spreading code such that only the desired signal related to the particular spreading code is enhanced while the other signals are not enhanced.

This system may use only one spreading code in the situation where the subscriber uses only a single television set. However, the system is uniquely adapted to provide interference free reception to multiple television sets tuned to different programs within the same premises. In like manner, the system provides prevention of interference from stray signals which may enter the premise from adjoining or nearby premises of other subscribers to the same or different multimedia distribution systems.

According to the invention, interactive multimedia services are particularly adapted to be provided to subscriber premises utilizing in whole or in part the public switched telephone network. In one preferred embodiment, the service is provided using an existing twisted wire pair subscriber line with Asymmetrical Digital Subscriber Line (ADSL) technology. The ADSL connection provides a 1.5 mbits/s downstream video information channel, a two-way telephone connection, and a 16 kbits/s control channel. This multiplexed signal is then separated and processed on premise and distributed in a two-way fashion as a complex radio frequency signal. Multiple television sets and telephone stations may be simultaneously served and may conversely communicate commands upstream to the multimedia network. A complete installation may be made in an entire premise without the necessity for any significant installation of new wiring. The system and methodology provide flexibility and are adapted to serve as an integral termination for multiple multimedia distribution and delivery architectures.

According to one embodiment of the invention, the wide band video or the like signal is distributed through the premise in a wireless fashion while two-way signaling relating to the wide band information and control of that information is distributed via the power line wiring in the premise.

BEST MODE FOR CARRYING OUT THE INVENTION

Architectural Overview of Video Dial Tone Network

Figure 1:
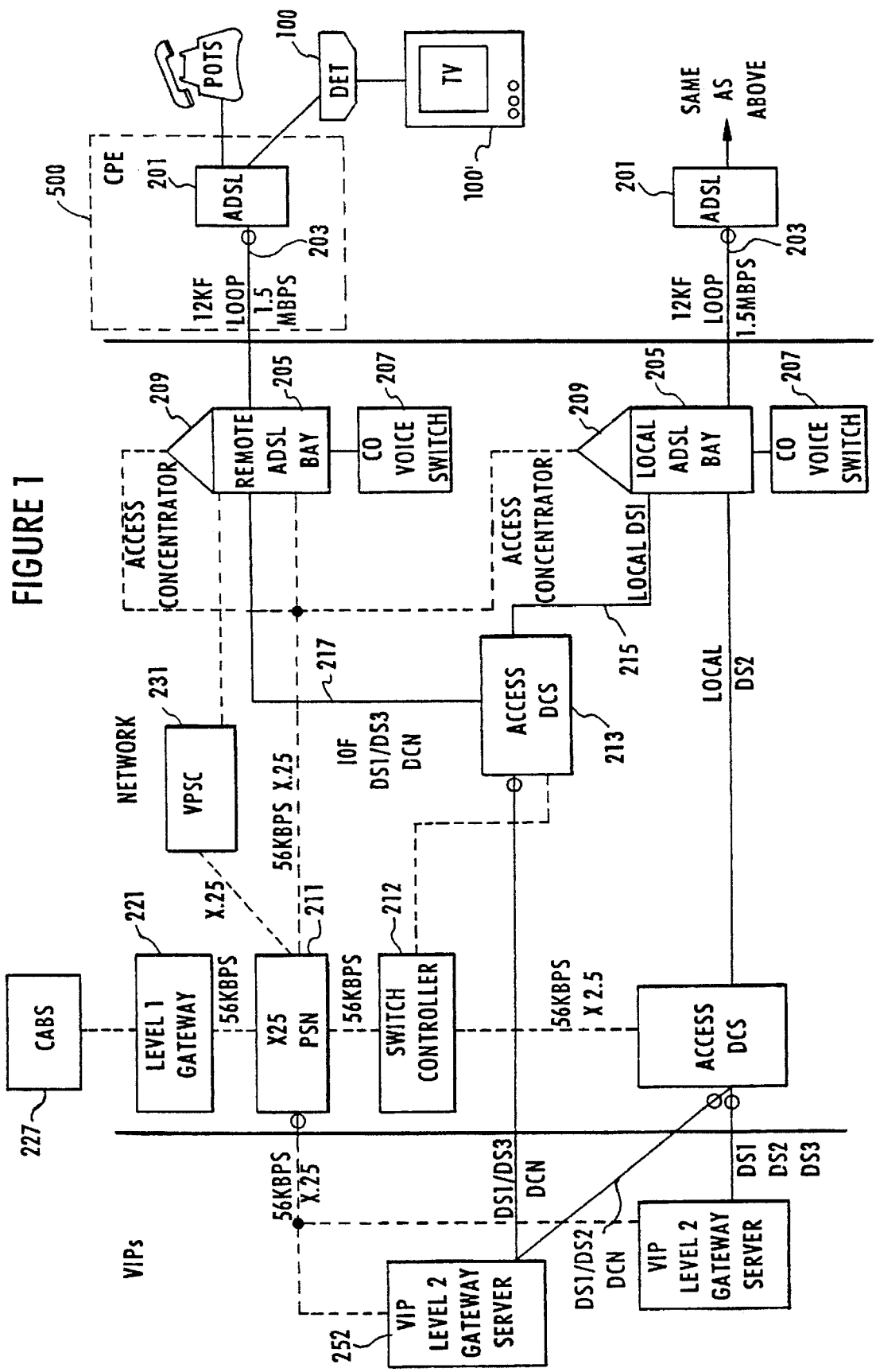
FIG. 1 is a block diagram of an example of a first Video Dial Tone Network utilizing a Level 1 Gateway which may be utilized with the present invention.

FIG. 1 is a block diagram of an exemplary broadband network for providing interactive services, such as video on demand, home shopping or purchasing, home banking, medical information, ticket ordering, gaming, etc. In the network shown, the customer premises equipment (CPE) consists of a set top terminal identified as "DET" (digital entertainment terminal) 100 and a telephone (POTS or ISDN). The connections to the central office utilize Asymmetrical Digital Subscriber Line (ADSL) technology, typically over twisted wire pair, similar to that disclosed in the above cited Litteral et al. Patent. The ADSL connection provides a 1.5 mbits/s downstream video information channel, a two-way telephone connection and a two-way 16 kbits/s control channel. The illustrated Video Dial Tone network architecture may use some form of fiber extension in the actual subscriber loops, to provide services to subscribers located more than 1.5 kilo-feet from a central office (see e.g. U.S. patent application Ser. No. 08/233,579, in the name of Bruce Kostreski, filed Apr. 26, 1994 and entitled "Extended Range Video On Demand System"). In the network illustrated in FIG. 1, the drop to the subscriber's premises is a wired ADSL loop.

As shown in FIG. 1, the network interface module in the DET 100 connects to an ADSL multiplexer/demultiplexer 201 similar to the in-home ADSL unit in the above discussed Litteral et al. Patent. As described in that patent, the connection between the network interface module of the DET 100 and the in-home ADSL unit 201 may consist of an RJ48C line and connectors. Such a link comprises six wire pairs, two for the broadband data, two for upstream signaling and two for downstream signaling. However, according to the present invention, the distribution on the premise will differ in the region indicated by the broken line rectangle, as is described in detail hereinafter.

Each ADSL subscriber line 203 connects to an ADSL bay 205 located in or associated with the subscriber's local central office. For each subscriber line 203, the ADSL bay 205 includes an ADSL multiplexer/demultiplexer similar to the central office ADSL unit in the above discussed Litteral et al. Patent. The ADSL bay 205 provides transport for voice signals on the subscriber loop to and from the associated voice switch 207. The ADSL bay 205 also connects to an access concentrator 209 for providing two-way signaling connections through an X.25 type packet switched data network 211. The ADSL bay 205 also receives broadband digital signals for downstream transport over the ADSL line 203 to each subscriber's premises from a digital cross connect switch 213, labelled "Access DCS" in the drawing.

One ADSL line 203 to the home carries one channel of video programming and provides a single output channel. The output channel can provide a video signal to a VCR (not shown) or to the TV set 100'. The various Access DCS switches throughout the network are controlled by switch controller 212.

If the ADSL bay 205 is local, i.e. located in the same telephone company central office as the cross connect switch DCS 213, the ADSL bay 205 connects to the Access DCS 213 via an appropriate number of local DS1 connections 215. In service areas where an ADSL bay does not carry enough traffic to warrant an associated Access DCS, the ADSL bay will be located in a remote central office facility. Such a remote ADSL bay connects to the Access DCS 213 via a SONET type optical fiber link 217 providing an appropriate number of multiplexed channels to service the number of subscribers connected to the particular ADSL bay.

Video Information service Providers (VIP's) may access the downstream broadband portion of the system at a hub location (not shown) within a given LATA. The hub will not perform any switching. High capacity optical fiber links are aggregated at the hub to provide each VIP with a number of connections (e.g. one or more OC-3 links) from their respective video server to each Access DCS within the LATA.

The Access DCS 213 provides both point-to-point connections and point-to-multipoint connections. Individualized interactive services, such as Video On Demand, home shopping/purchasing and banking, use point-to-point connections wherein the Access DCS connects one broadband input port from a VIP's server to one output port going to the subscriber's ADSL line. Narrowcast and broadcast services utilize point-to-multi-point connections of one input port to a plurality of output ports.

The illustrated architecture of the Video Dial Tone network utilizes two levels of gateways, both of which will communicate with subscribers' DET's via the X.25 data network 211 and the signaling channel on the ADSL subscriber loops 203.

The Level 1 Gateway 221 performs a variety of network connectivity related functions, including communications port management of transmissions of information between subscribers and servers, processing of billing information and session management. Normally, each subscriber accesses the Level 1 Gateway (e.g. to select and access a particular VIP's server) by operation of a remote control device which causes the subscriber's DET 100 to transmit data signals to the Level 1 Gateway via the 16 kbits/s control channel and the X.25 packet switched data network 211. The Level 1 Gateway transmits one or more selection menus to the subscriber's DET 100 as screens of text data carried by the same path back through the network.

In the present implementation, text or graphics information from the Level 1 Gateway is displayed as a page of data. Alternatively, the text or graphics data could be overlaid on a video display received through the broadband network, e.g. over one of the broadcast channels carried through the more advanced networks discussed below.

In a typical scenario, the user would turn on the DET terminal 100, and in response to data signals from the Level 1 Gateway 221, the terminal would display an initial selection menu. The subscriber would input a selection, and in response to an appropriate data signal from the DET 100, the Level 1 Gateway 221 would instruct the various network components to set up a virtual circuit to the level 2 gateway of a selected VIP for signaling purposes and a direct downstream path from the VIP's server through the digital cross-connect switch 213 for video transmission.

The Level 1 Gateway 221 accumulates usage statistics relating to the broadband communication links through the network and supplies those statistics to a billing system, e.g. to a carrier access billing system (CABS) 227 as shown in FIG. 1. The Level 1 Gateway 221 also exchanges various network operational status information with the switch controller 212 and with a video provider service center (VPSC) 231.

A level 2 gateway provides a number of services for the Information Providers. These services include transmission of menus of available information to subscribers, searches of available information, targeted advertisement insertion, previews, trailers, etc. The level 2 gateway will download video or audio menus to each subscriber's DET for display, thereby allowing each subscriber to select desired information. Once a subscriber makes a selection, the level 2 gateway will signal the appropriate server to schedule transmission of the selected information through the established downstream video transmission path. The Level 1 Gateway accumulates connectivity charge information for purposes of billing each called VIP. The level 2 gateway records transactions, e.g. movies viewed, by each subscriber for billing purposes. The level 2 gateway also interacts with the DET 100 and controls the associated servers to download executable program code for storage in the DET system memory.

The switch controller 212 monitors operations of the digital cross connect switches 213 and provides appropriate information to the Level 1 Gateway. For example, if the switch controller 212 indicates that a broadband communication link through one of the switches has failed for some reason, the Level 1 Gateway will terminate its accumulation of usage data for billing for the particular broadband session. The video provider service center (VPSC) 231 performs a related monitoring function with regard to the ADSL loops.

The ADSL bays 205 monitor communications over the subscriber lines 203 by periodically enquiring as to the status of each on-premise ADSL unit 201. The ADSL bays 205 in turn inform the video provider service center (VPSC) 231 of any detected failures via data connections to that center (only one such data connection is illustrated in FIG. 1). In the presently preferred embodiment of the network of FIG. 1, the service center (VPSC) 231 is manned with operations support personnel. In response to a failure alarm indicating one of the ADSL lines is down, the center 231 provides a display for review by one of the technicians. A VIP may also call in and indicate that the VIP's system 252 has detected some form of failure. Based on the displayed information and/or the information from the VIP, the technician decides whether in fact a failure has occurred. If so, the technician initiates an X.25 data call and transmission of a message from the video provider service center (VPSC) 231 to the Level 1 Gateway 221 identifying the failed link and instructing the Gateway 221 to tear down the particular broadband link. The Level 1 Gateway 221 terminates its accumulation of usage time data for that link and instructs the switch controller 212 to tear down the link.

Upon detection of a fault and reporting thereof to the video provider service center (VPSC) 231, personnel at the center can initiate action to correct the fault. For example, if the switch controller 212 reports a fault in a particular switch 213, the personnel at the service center (VPSC) 231 can call a technician at the central office housing that switch and have that technician test the switch and correct any faults actually discovered. Similarly, if an ADSL bay 205 reports some fault on the twisted wire pair 203 or loss of communications with the on-premises ADSL unit 201, the personnel at the service center (VPSC) 231 can dispatch a repair technician to locate and correct the fault on the line or in the on-premises unit.

As discussed in more detail with regard to later network embodiments, it is preferred for more advanced versions of the network that the function of the video provider service center (VPSC) 231 be fully automated to instruct the Level 1 Gateway 221 to stop billing data accumulation and tear down faulty broadband links without human intervention.

The Video Dial Tone network of FIG. 1 provides video on demand and other broadband interactive multimedia services offered by a plurality of service providers. For example, using the upstream data channel, the subscriber can send a request for a particular movie from his VIP of choice, and the VIP's server will retrieve and transmit that movie as an MPEG digital data stream on the 1.5 Mbits/s downstream channel to the digital audio/video processor in the subscriber's DET 100.

Although other digital compression encoding schemes may be used, such as DIGICIPHER™, the preferred embodiments of the present invention utilize MPEG encoding and decoding. MPEG (moving picture experts group) is a broad generic standard for video program compression, and MPEG 2 is a second generation compression standard for packetized transport of one or more compressed video program signals in a single stream. A number of specific compression algorithms will satisfy MPEG requirements. Typically, MPEG permits encoding of audio/video program materials into digitized, compressed format at rates in the range of 1.5 to 6 Mbits/sec.

In the illustrated network, the DET 100 includes a CPU, comprising a 386 or 486 microprocessor and associated memory (RAM, ROM and EPROM) and an audio/video decoder, controlled by the CPU. The audio/video decoder decompresses the digitized broadband information. The preferred embodiment of the audio/video decoder comprises an MPEG video decoder, an MPEG audio decoder, and an MPEG demultiplexer for selectively routing MPEG encoded video and audio packets carried on the digital broadband channel to the MPEG video decoder and the MPEG audio decoder, respectively. The DET also includes a graphics display generator for generating displays of received text data, such as the initial turn-on selection menu, discussed in more detail below. The DET also includes digital to analog converters and appropriate drivers to produce output signals compatible with a conventional television set from the decoded audio/video information and the graphics display. Each DET also includes means to receive selection signals from a user and transmit appropriate data signals over a narrowband channel through the particular video network.

The digital entertainment terminal (DET) 100 is a programmable device to which different individual video information providers (VIP's) can download different applications software. At least one VIP, typically a vendor of the DET, also can download portions of the operating system. The DET will permanently store only an operating system and a loader program, to control initial communications with a Level 1 Gateway or to facilitate initialization into a simplified CATV type mode of operation.

The operation of the network of FIG. 1 is described in further detail in commonly assigned application Ser. No. 08/304,174 filed Sep. 12, 1994, entitled "Level 1 Gateway for Video Dial Tone Networks" (680-093), which is incorporated entirely herein by reference.

Wireless Premise Distribution

Figure 5:
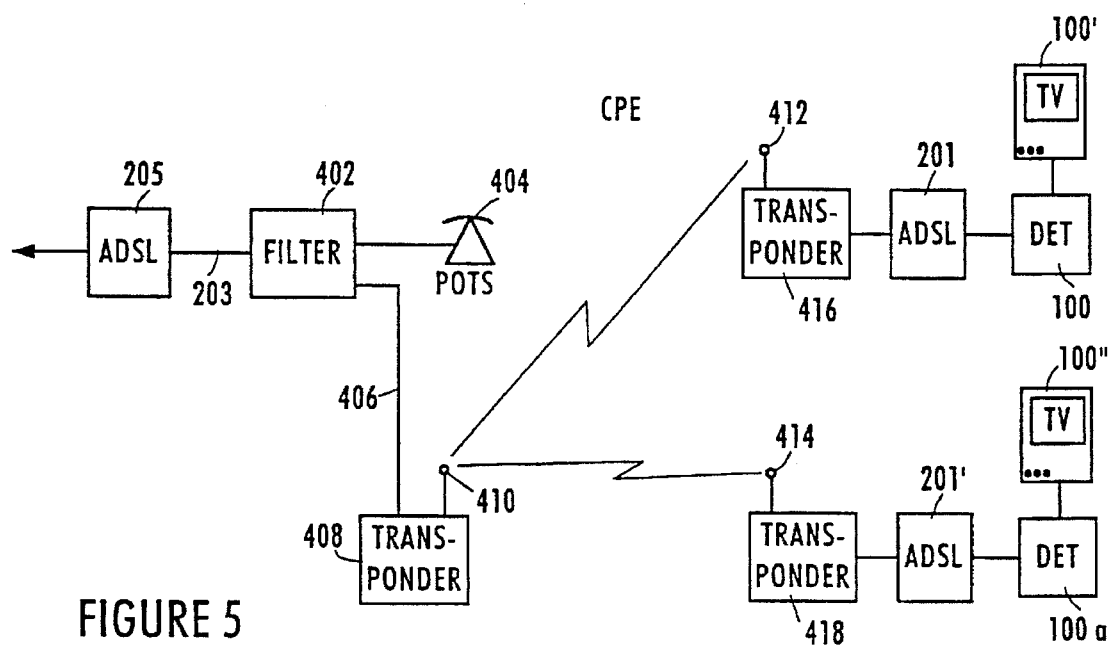
FIG. 5 illustrates the implementation of the invention according to one embodiment utilizing the type of network illustrated in FIG. 1.

Referring to FIG. 5, there is shown one arrangement for providing wireless on-premise distribution of the 1.5 mbits/s downstream video information channel and two-way 16 kbits/s control channel using the ADSL architecture described above in connection with FIG. 1 according to a first embodiment of the invention. It will be understood that the invention is also applicable to other distribution architectures presently to be described. The same reference numerals have been used in FIG. 5 as are found in FIG. 1 where applicable. In the embodiment of FIG. 5 the CPE premise includes multiple television sets here indicated at 100' and 100" connected to multiple DET's 100 and 100a. These DETs are in turn connected to ADSL units 201 and 201'.

The remote ADSL 205 is shown beyond the CPE and is connected through a subscriber line to a filter 402 which separates the two-way voiceband signal to the POTS 404 and the multiplexed broadband 1.5 mbits/s television signal and two-way 16 kbits/s signaling channel delivered via connection 406. These signals on connection 406 are inputted to a suitable transponder 408. The transponder 408 translates the frequency of these inputted signals to the radio frequency range and radiates the same through a suitable antenna 410. The radiated signals are received by antennas 412 and 414 associated with transponders 416 and 418. The transponders 416 and 418 translate the radio frequency signals back to the original 1.5 mbit/s and 16 kbits/s signals which are then fed as inputs to the ADSL units 201 and 201' for delivery to the DETs 100 and 100a and television sets 100' and 100" in the manner described in connection with FIG. 1.

As will be understood by those skilled in the art, the transponders comprise linear translators having a receiver or input pass band wide enough to include multiple channels. These signals are amplified, shifted to a new frequency range, and in the case of the transponder 408, then transmitted as radio frequency signals without modulation or alteration of the signal content. The transponders 416 and 418 receive the radio frequency signals, translate the frequency to the original 1.5 mbits/s and 16 kbits/s and input the same to the ADSL units 201 and 201'. A typical such transponder or translator is illustrated in FIG. 7.

Figure 7:
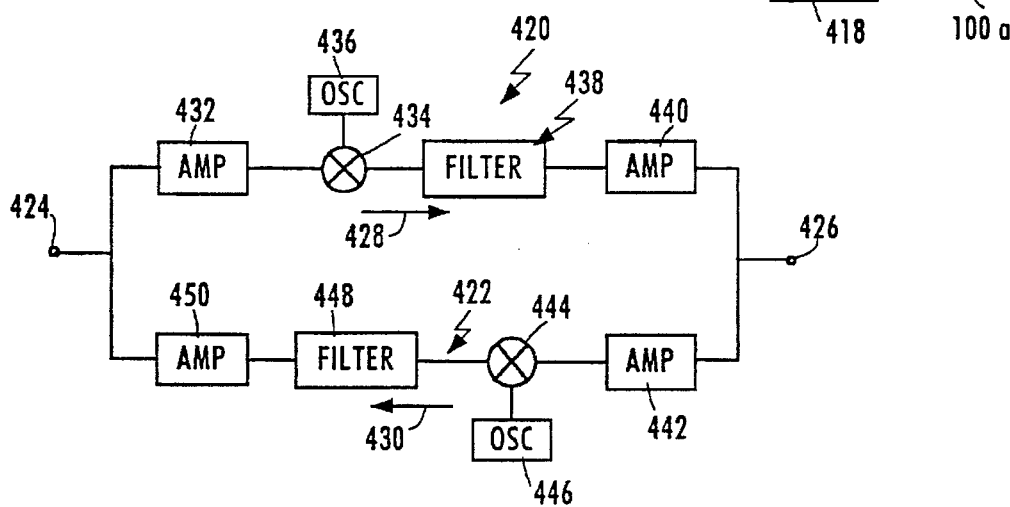
FIG. 7 shows a simplified block diagram of a translator or transponder which may be utilized in the invention.

Referring to FIG. 7, the transponder is in many respects similar to a transceiver in that it possesses a pair of signal handling channels for operating in converse fashions on signals in opposite directions. Thus there is seen one channel indicated at 420 and another channel indicated at 422. The input/output terminals 424 and 426 are served by channel 420 to handle signals in the direction of the arrow 428 while channel 422 handles signals in the opposite direction indicated by the arrow 430. Channel 420 may receive at input/output terminal 424 the 1.5 mbits/s and 16 kbits/s signals, amplify the same via amplifier 432, and deliver the amplified signals to a mixer 434, fed by the oscillator 436. The mixing raises the frequency to the radio frequency range and this signal is passed through a filter 438 and amplifier 440 to the input/output terminal 426. In the case of transponder 408 in FIG. 5, the terminal 426 would terminate in the antenna 410.

The transponders 416 and 418 receiving the radio signal from the antenna 410 would handle the incoming signals in a converse fashion through the channel 422. Thus the radio frequency signals would be received by an antenna connected to the terminal 426. This signal would pass through amplifier 442, mixer 444, controlled by oscillator 446, filter 448, and amplifier 450. In this case, the upstream 16 kbits/s control signal from the ADSL is raised to radio frequency and transmitted back to the transponder 408. In transponder 408 the radio frequency signal is translated back to the 16 kbits/s form and delivered upstream to the remote ADSL 205 for the control purposes described in connection with FIG. 1.

It will be apparent that other transponder circuits may be utilized in a manner well known in the art. See, *Radio Handbook*, 23d edition, William Orr, SAMS Division of MacMillan Computer Publishing, 1987; *Satellite Communications*, Robert M. Gagliardi, Lifetime Learning Publications, 1984; and *Digital Satellite Communications*, 2d edition, Tri T. Ha, McGraw-Hill Communications Series, McGraw-Hill Publishing Company, 1990.

Figure 6:
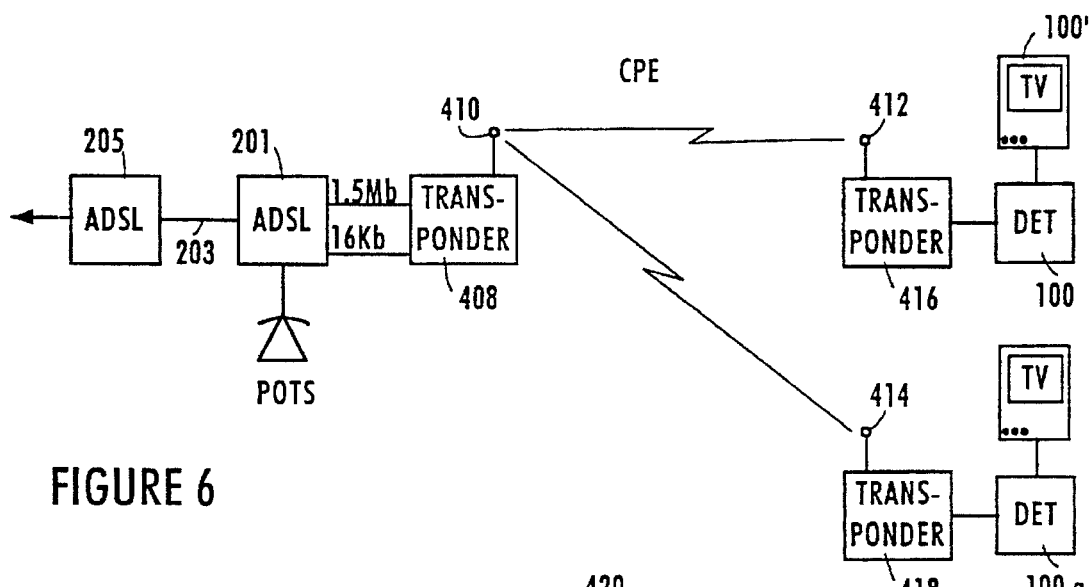
FIG. 6 illustrates another embodiment of utilization of the invention in a network of the type illustrated in FIG. 1.

Referring to FIG. 6, there is shown another embodiment of wireless CPE distribution using an ADSL system. Similar reference numbers are used where applicable. In this embodiment, a single CPE ADSL unit is utilized connected to the subscriber line 203 and feeding the 1.5 mbits/s and 16 kbits/s signals to the transponder 408. These signals are translated to radio frequency and transmitted in turn to transponders 416 and 418. The transponders translate the radio frequency back to the original 1.5 mbits/s and 16 kbits/s signals and deliver the same to the DET's 100 and 100a. The return or upstream 16 kbits/s control signals are translated to radio frequency in transponders 416 and 418, transmitted to transponder 408 and there returned to the 16 kbits/s form for input to the ADSL 201 and transmission upstream to the remote ADSL 205. In the embodiment of the invention illustrated in FIG. 5, the telephone (POTS or ISDN) circuit is separated from the incoming signal on the subscriber line at the filter 402 (or equivalent) device in the case of an ISDN installation. In the embodiment illustrated in FIG. 6 the POTS line is broken out from the ADSL as described in connection with FIG. 1.

While the foregoing discussion has concentrated on the operation of those embodiments of the invention utilizing an ADSL architecture, the invention is equally applicable utilizing other architectures such as those now described in connection with FIGS. 2 and 3.

Fiber-To-The-Curb

Figure 2B:
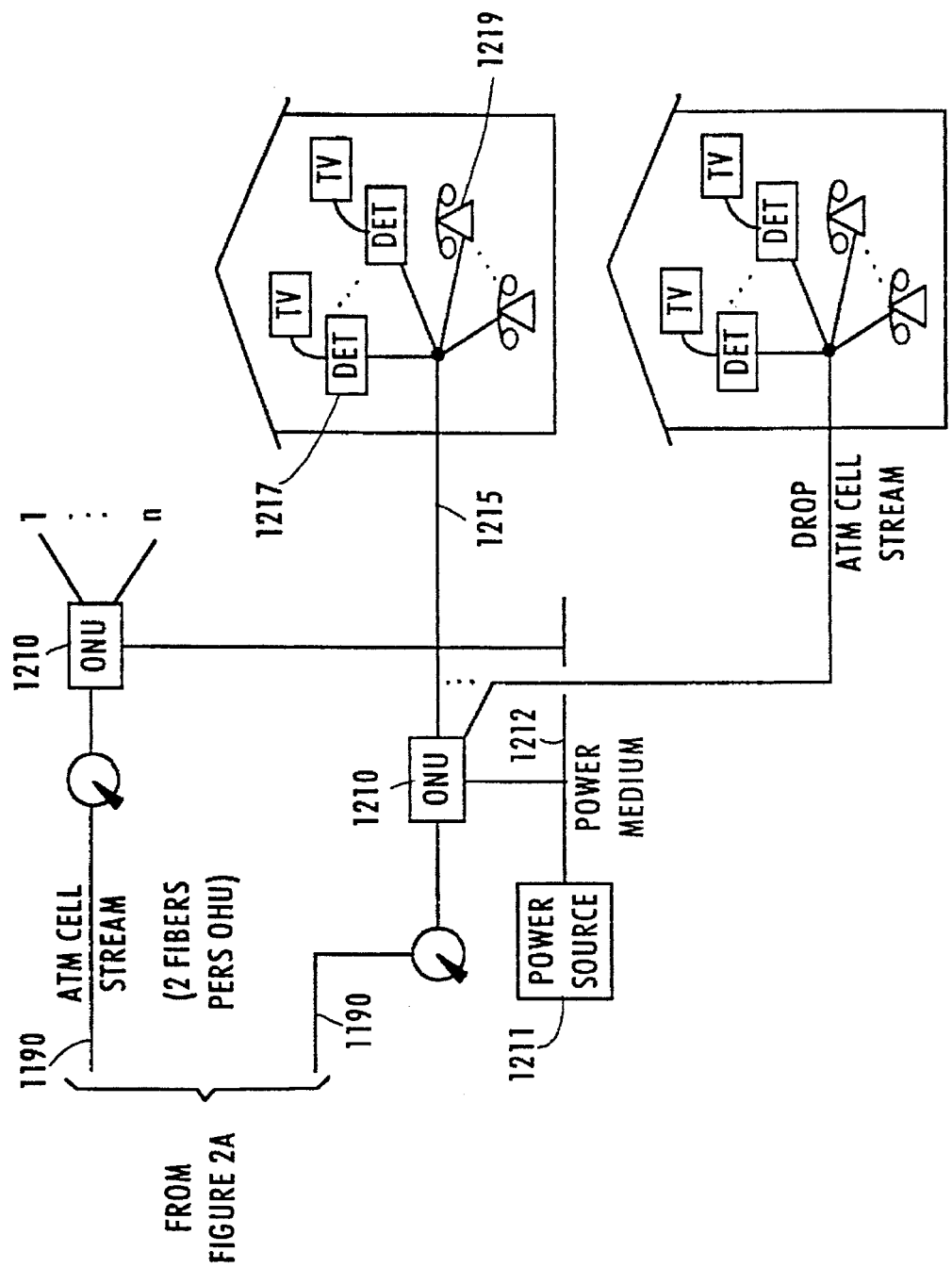
FIG. 2 (2A,2B) is a block diagram of one example of an alternate network architecture utilizing a Level 1 Gateway in a manner adapted to the present invention.

FIG. 2 depicts an example of one such advanced video dial tone network utilizing the Level 1 Gateway. The illustrated network utilizes an advanced fiber to the curb system with ATM (Asynchronous Transport Mode) transport, and is similar to one of the networks disclosed in commonly assigned application Ser. No. 08/250,792, filed May 27, 1994, entitled "Full Service Network" (attorney docket No. 680-080), the disclosure of which is incorporated herein entirely by reference. The network of FIG. 2 uses essentially a switched star type architecture.

The Full Service Network illustrated in FIG. 2 provides broadcast video distribution, archival video services and interactive multi-media services as well as a suite of narrowband services including plain old telephone service. As illustrated in that drawing, the broadcast video services will initiate from a broadcast type server, such as ATM video source 1101 or aa digitally encoded off the air TV signal. The broadcast server source 1101 includes an actual analog video source 1110. Although only one is shown, a typical broadcast service provider will have a plurality of such video sources in the same or separate server systems. The analog signal from the source is carried by any convenient means, such as an optical fiber, etc. Means (not shown) are provided as necessary to convert analog video transmission signals, e.g. NTSC broadcast signals, to baseband video and audio signals. The baseband signals are applied to a real time encoder 1120.

The real time encoder 1120 digitizes the audio and video signals and performs data compression. As currently envisaged, the encoder will encode the program signal into an MPEG 2 format.

The illustrated real time encoder 1120 preferably is set up as a bank of encoders to process six or more sets of analog audio/video program signals in parallel. As such, the bank of encoders 1110 produces six 6 Mbits/sec MPEG 2 bit streams, which are combined together with appropriate overhead information into a single 45 Mbits/sec DS-3 type signal. The DS-3 signal from the encoder 1120 is input to an interworking unit (IWU) 1130. The interworking unit 1130 is the actual input point for the encoded broadcast video information into the Full Service Network of FIG. 2.

The Full Service Network uses asynchronous transfer mode (ATM) switching to transport all broadband or video information, including the broadcast video information. ATM is a packet oriented time division multiplexing technique. In ATM, information is organized into cells. Each cell includes a header, primarily for identifying cells relating to the same virtual connection, and an information field or "payload". In one proposal, a 53 octet ATM cell would include a cell header consisting of 5 octets and a payload consisting of 48 octets of data. One MPEG 2 packet would be mapped into payload data in four such ATM cells. Transfer is asynchronous in the sense that the recurrence of cells that contain information from any particular sender is not necessarily periodic. Each device using the ATM network submits a cell for transfer when they have a cell to send, not when they have an assigned or available transmission time slot. ATM allows any arbitrary information transfer rate up to the maximum supported by the ATM network, simply by transmitting cells more often as more bandwidth is needed. In an initial implementation of the Network of FIG. 2, however, all video materials will be transferred at a constant, standardized bit rate. Preferred later generations of the network will utilize the ATM capabilities of the network to permit transmission of video information over channels of different bit rates, e.g. 1.5 Mbits/sec, 3 Mbits/sec, 6 Mbits/sec, etc. It will also be possible to vary the bit rate during communication on an as needed basis.

The interworking unit 1130 grooms the continuous MPEG 2 bit streams of the broadcast services for ATM cell stream transmission over optical fiber transport links. For example, the interworking unit will divide the bit stream into appropriate length payloads and combine the payload data with appropriate cell headers, necessary for ATM transport. In an initial implementation, downstream links would carry an OC-12 bit rate, but higher rate transports such as OC-48 will be used in later implementations. Assuming use of OC-12, one such transport link will normally carry the equivalent of 112 DS-3's. However, conversion into ATM cell format with associated headers imposes added overhead requirements on the data transmissions. In the presently preferred embodiment, one interworking unit 1130 therefore processes up to ten DS-3 signals to produce an ATM bit stream at the OC-12 rate.

A transport interface 1140 converts the electrical signal from the interworking unit 1130 into an optical signal and transmits the optical signal through fiber 1150 to an adaptive digital multiplexer (ADM) identified in the drawing as a video bridging and insertion device 1160. The ADM 1160 performs three functions, passive bridging, active bridging and insertion of signals from other broadcast service providers (if any). The three functions may actually be separate, but in the preferred embodiment, all three would be performed by elements collocated within the one network component ADM 1160.

As noted above, the real time encoders 1120 each output a single DS-3 signal comprising up to 6 MPEG 2 bit streams. The interworking unit 1130 processes up to ten DS-3 signals to produce an ATM bit stream at the OC-12 rate. Consequently, one broadcast video source 1101 may produce as many as 60 channels of CATV type broadcast programming for transport over one OC-12 type SONET optical fiber 1150. Many providers, however, may not choose to broadcast so many channels. For example, the provider operating broadcast video source 1101 may offer only 42 channels. Such an ATM channel transmission on the optical fiber 1150 will not utilize the entire OC-12 channel capacity of that fiber. In the specific example, the 42 channels together require the equivalent of 7 of the available 10 DS-3's.

The illustrated architecture permits a second broadcast service provider to utilize the transport capacity not used by the first provider. The second broadcast service provider would offer additional channels from a separate second source 1101'. The source 1101' is essentially identical in structure and operation to the source 1101, but the source 1101' will offer up to the number of channels necessary to fill the OC-12 transport capacity. In the example, if the source 1101 transmits 42 channels (7 DS-3's) via the fiber 1150, the second source 1101' could transmit up to 18 additional channels (3 DS-3's). The function of the insertion device in the ADM 1160 is to combine the signals from the two sources into a single OC-12 rate signal (10 DS-3's in ATM cell format) for further transmission through the optical network.

The two bridging functions facilitate dissemination of the broadcast material throughout the entire Full Service Network. The passive bridging elements are optical splitters for splitting one OC-12 optical signal from the insertion device into a number of duplicates thereof, e.g. 1:2, 1:4, 1:8, etc. The active bridging elements convert an optical signal to an electrical signal, regenerate the electrical signal and convert the regenerated signal back to an optical signal for application to multiple output ports. The optical OC-12 output signals from the bridging components are transmitted over a large number of optical fibers 1170 to host digital terminals throughout the network service area. The host data terminal (HDT) 1180 is shown as a representative example.

When a subscriber requests a specific broadcast channel, the digital entertainment terminal (DET) in the subscriber's home provides a signal identifying the selected channel to the HDT 1180. The signaling between the digital entertainment terminal (DET) and the HDT 1180 will be discussed in more detail below. Inside the HDT, the ATM cell stream from an optical fiber 1170 is applied to a bus. To carry larger numbers of channels, there would be duplicate sources, insertion devices and bridging elements to transport the additional channels over fibers parallel to the illustrated fibers 1170. Signals from one or more such additional parallel fibers would be applied to corresponding parallel buses inside HDT 1180.

One HDT will communicate with a large number of optical network unit (ONU's) 1210, two of which are shown. The HDT will communicate with each ONU 1210 via a pair of optical fibers 1190. In the presently preferred implementation, each home or living unit will have as many as four DET's. Each ONU 1210 and the downstream fiber of the pair 1190 to the ONU 1210 will provide downstream video services to a number of homes, e.g. 8 to 24. The transmissions on the downstream fibers between the HDT and the ONU's 1210 are synchronous, although the video information remains in ATM cell format. Each DET served by an ONU 1210 is assigned a specified time slot on the downstream fiber of a pair 1190.

The HDT 1180 includes a component which is essentially a non-blocking type ATM switch. In response to the selection signal from a DET, the HDT 1180 accesses the appropriate bus and identifies each ATM cell on that bus for which the header information indicates that the cell represents information for the selected broadcast channel. The identified ATM cells are bridged by the ATM switch from the bus to a line card providing transmissions over the optical fiber 1190 to the particular ONU 1210 which services the requesting subscriber's premises. When the HDT selects each ATM cell for transmission to a specific DET, elements on the line card communicating with the particular ONU will buffer the cell as necessary and place the cell in the time slot for that DET on the downstream fiber of optical fiber pair 1190. The cells selected for a particular DET, together with cells going to other DET's served by the same ONU multiplexed into their respective time slots, are applied to an electrical to optical converter and transmitted over the downstream fiber to the ONU 1210 serving the particular subscriber's premises.

The basic purpose of the ONU is to desegregate the HDT side links into individual customer links and provide optical to electrical conversion for electrical delivery to the individual subscribers' premises. Although depicted by a single line in the drawing, in the currently preferred implementation, the drop cable to each subscriber's premises comprises a coaxial cable for carrying the video and/or two-way digital data signals and a twisted wire pair for carrying telephone signaling. Alternatively, ADSL communications over twisted wire pair could be used between the ONU and the subscribers premises. In the preferred embodiment, the ONU includes means to convert optical signals received over the downstream fiber to electrical signals and transmit signals from each DET's assigned time slot down over the coaxial cable to the subscriber's premises. The ONU also provides two-way conversion between optical and electrical signals for voice telephone service over the twisted wire pairs and for the signaling channels to/from the DET's.

A power source 1211 supplies −130 V dc and battery reserve power for telephone service to the ONU's 1210. The power source 1211 may connect to the ONU's via twisted pairs, but in the preferred embodiment, the power is carried over a coax distribution cable.

The digital entertainment terminal (DET) 1217 is a programmable device to which different applications programs and/or portions of the operating system will be downloaded from a gateway device in order to permit the DET to interact with different information service providers and thereby offer the user totally different types of services. The DET may be similar to that used in the network of FIG. 1, with the exception that the network interface module within the DET 1217 provides the various broadband and signaling connections to a coaxial cable, instead of to an interface to an ADSL twisted wire pair type line, and the communication software within the DET is adapted to process ATM transported information.

The DET 1217 includes means (not shown) to demodulate received data and convert ATM cell stream data into bit stream data for further processing. As in the earlier embodiment, the DET 1217 also includes a digital signal processor to decompress received video signals as well as a graphics display generator for generating displays of text data, such as the initial turn-on selection menu. The DET will also include a digital to analog converter and appropriate drivers to produce output signals compatible with a conventional television set. Each DET 1217 also includes the means to receive selection signals from a user and transmit appropriate data signals over a narrowband channel on the coaxial drop cable to the ONU 1210.

The ONU multiplexes the user input data signals from the DET's it services together and transmits those signals to the HDT over an upstream fiber of the optical fiber pair 1190. The HDT transmits the upstream control signals to control elements referred to as gateways. In an initial implementation, the HDT's communicate with the gateways through an X.25 type data network. Future implementations will use ATM communications for the signaling.

In the network of FIG. 2, the Level 1 Gateway 1230 provides primary control of all routing and access functions of the network and accumulates various usage statistics, in a manner substantially similar to that of the Level 1 Gateway 221 in the network of FIG. 1. The control functions include controlling access to broadcast programs by individual subscribers. Control of access to on demand programming and interactive multimedia services through a PVC controller 1420 and an ATM switch 1410 will be discussed in more detail below. The Level 1 Gateway also will transmit narrowband information to the DET 1217 instructing it to initiate display of various selection menus of available video information service providers.

The Level 1 Gateway connects to a service administration module (SAM) which maintains a data base of video information service providers and customer profile data for the broadcast, archival and interactive video services available through the network. This data may include customized menus, pre-subscription information, identification of impulse pay per view events and premium channels, etc. Under different circumstances, the video information providers and/or the individual customers can access this data for provisioning. The Level 1 Gateway also connects to an operations support module (OSM). The operations support module provides an interface to standard operating support systems used for additional network provisioning functions.

When the subscriber selects a specific broadcast channel, the DET 1217 transmits data upstream through the various network elements to the Level 1 Gateway identifying the selected channel. In response, the Level 1 Gateway 1230 accesses stored data regarding the broadcast services to which the customer currently subscribes. If the customer subscribes to the requested service, the Level 1 Gateway 1230 transmits an instruction to the HDT 1180 to route the cells for that channel to the subscriber's DET 1217 in the manner discussed above. If the customer is not currently a subscriber to that service, the Level 1 Gateway 1230 transmits a data message back to the DET 1217 instructing it to provide an appropriate television display, e.g. informing the customer of a service denial and/or asking the subscriber for appropriate inputs to initiate a new subscription.

The above selection procedure through the Level 1 Gateway provides the Gateway 1230 with information as to each selection a subscriber makes and when the selection is made. The Level 1 Gateway also receives information as to when a DET session ends, e.g. upon turn-off of the DET or upon request for a session with a different provider. As such, the Level 1 Gateway has all information necessary to accumulate a variety of statistics as to viewer usage both for billing purposes and for audience accounting purposes.

As an alternative to the real time control of broadcast program selection and access by the Level 1 Gateway discussed above, certain relevant control data could be downloaded to the HDT, either from the Gateway 1230 or from the service administration module (SAM). With this modification, the broadcast VIP's would provide provisioning data to the SAM, and the SAM periodically downloads that data to the appropriate HDT's, either directly or through the Level 1 Gateway 1230.

The provisioning data downloaded to the HDT's 1180 would include channel mapping information and subscriber authorization control information. The channel mapping information specifies what programs are carried on each ATM virtual circuit, within each DS-3, on each respective optical fiber 1170. The HDT 1180 accesses the channel mapping information in response to each program selection by a subscriber to route the ATM cell stream to the requesting DET. The authorization control data would indicate which program each subscriber is authorized to access, e.g. because that party has subscribed to the particular program service and is not delinquent in bill payments. When a subscriber requests a program, the HDT 1180 would check this data to determine whether or not to supply the program to the subscriber's DET 1217. As the HDT 1180 routes selected channels to the DET's 1217, the HDT would accumulate usage data and/or pay per view event purchase data for the subscribers serviced thereby. The HDT 1180 would periodically upload such usage data to the Level 1 Gateway 1230 and/or to the SAM for subsequent transmission to appropriate billing systems of the network service provider or the VIP's, respectively.

In addition to broadcast video, the network of FIG. 2 offers subscribers access to other wideband services, such as video on demand and interactive multimedia services. Access to these additional broadband services is through an ATM switch 1410. As discussed in more detail below, the access through this switch is controlled by the Level 1 Gateway 1230 in a manner quite similar to the routing to a VIP in the network of FIG. 1.

Each of the non-broadcast service providers 1400 will have a level 2 Gateway 1401 and some form of file server 1403 or other source of information. The video information provider's (VIP's) system may provide ATM cell stream outputs for transmission through the network. Alternatively, if the provider's equipment transmits only bit stream data, the network operator would supply an interworking unit similar to the unit 1130 discussed above to convert the provider's bit stream data into an ATM cell stream format compatible with the Full Service Network. The ATM switch transmits selected ATM cells via optical fibers 1415 to the HDT's 1180.

To establish a broadband communication session or connection through the network between an interactive information service provider 1400 and a particular DET 1217 requires establishment of a virtual circuit through the ATM switch 1410 and the appropriate HDT 1180. In the network of FIG. 2, a PVC controller 1420 stores data tables defining all possible virtual circuits through the ATM switch and the HDT's to each terminal of a customer subscribing to a particular provider's services. These data tables define the header information and the particular fiber output port used to route cells to the correct HDT and the time slot information on the downstream fiber to the appropriate ONU serving each DET. The data tables thus define "permanent virtual circuits" (PVC's) between the providers and the DET's.

When a subscriber initiates a session with a broadband interactive service provider, for example VIP 1400, the subscriber's DET 1217 provides an appropriate "off-hook" signal to the HDT 1180. The HDT 1180 sends the message through the X.25 packet switched network to the Level 1 Gateway 1230. Alternatively, signaling may also be achieved using ATM calls through HDT and ATM video switch to the level 1 Gateway 1230. When the Level 1 Gateway 1230 receives the addressed message from the HDT, that Gateway uses the X.121 or other protocols address of the caller included in the message to check its internal database to determine if the caller is a valid network customer. If the caller is not a valid customer, the system tears downs the session. If the caller is a valid customer, the Level 1 Gateway 1230 transmits an X.25 or ATM call accept message back to the terminal and waits for the first application level message.

Once the call is accepted and an X.25 signaling link is provided, the DET 1217 sends an initiation message that says "hello". This "hello" message includes basic information such as a customer premises equipment (CPE) identifier and a CPE type designation. The Level 1 Gateway 1230 sends a menu and a banner through the downstream signaling channel, as in the earlier network embodiment. As discussed above, the menu is a screen of text listing VIP's available to this customer or the VIP's that the customer as previously selected for purposes of her customized menu presentation. The subscriber reviews the menu on their television set, and operates the arrow keys on the DET remote control to move a cursor across the menu to an appropriate point on the screen, after which the user presses an <ENTER> key on the keypad or remote control. In response to the VIP selection input, the DET 1217 transmits an appropriate data signal upstream through the network to the Level 1 Gateway 1230.

The Level 1 Gateway may execute a PIN number access routine, as in the earlier embodiment, if the subscriber has previously requested such access control for selected ones of the VIP's. For simplicity here, it is assumed that the currently selected VIP is not subject to such a PIN number requirement. The Level 1 Gateway is merely expecting to receive the VIP selection input from the DET within a predetermined period following the menu transmission. If the Level 1 Gateway receives the selection input message from the DET within the predetermined period, the Gateway 1230 translates that message into the 4 digit code for the selected VIP's Level 2 Gateway.

At that time, the Level 1 Gateway sends a message to the DET saying please wait while we connect to the VIP. The Level 1 Gateway then goes over the X.25 or ATM network to communicate with the selected VIP's Level 2 Gateway. Assuming that the subscriber selected VIP 1400, the Level 1 Gateway 1230 contacts the level 2 Gateway 1401 and indicates that it has a customer calling. The Level 1 Gateway 1230 identifies the customer to the level 2 Gateway 1401 by sending the standard billing telephone number for the calling customer to the Level 2 Gateway. The CPE identification information and the CPE-type information that was sent in the initial origination message is also sent to the Level 2 Gateway (VIP) at this time. The VIP's Level 2 Gateway may accept or reject the call after receiving the initial request indicating a customer is available, as in the network of FIG. 1. If the Level 2 Gateway 1402 sends a message back to the Level 1 Gateway 1230 indicating a rejection of the call, the Level 1 Gateway transmits a message to the DET 1217 instructing that terminal to display some form of call rejection notice on the associated TV.

Alternatively, the Level 2 Gateway 1401 accepts the call, provides a server output port and gives a port identification for the port on the server 1403 to the Level 1 Gateway 1230. In response, the Level 1 Gateway transmits the X.121 address of the calling customer's DET 1217 to the Level 2 Gateway 1401. The Level 2 Gateway uses that address to initiate a new signaling communication through the X.25 network 1220 with the subscriber's set-top terminal DET 1217. The Level 1 Gateway identifies the broadband communication link number for the channel going out from the HDT to the requesting customer's DET 1217. The Gateway 1230 sends a message to the PVC controller 1420 to establish a virtual circuit between the selected provider 1400 and the subscriber's DET 1217. The PVC controller accesses its data tables to identify an available permanent virtual circuit between the provider 1400 and the DET 1217 for which all necessary elements are currently available. When an available circuit is identified, the PVC controller 1420 provides appropriate instructions to the ATM switch 1410 and informs the Level 1 Gateway 1230 of the virtual circuit identifier. The Level 1 Gateway 1230 informs the HDT 1180 of that virtual circuit identifier and instructs the HDT 1180 to "lock-up" that circuit as a currently active virtual circuit providing broadband communications from the server 1403 of the provider 1400 to the subscriber's DET 1217.

If the broadband communication connection is successfully established between the VIP's server port and the customer's DET, the PVC controller 1420 transmits back an appropriate indication thereof to the Level 1 Gateway 1230. Then the Level 1 Gateway tears down its own X.25 signaling connection with the subscriber's set-top terminal. At the same time, the Level 1 Gateway 1230 informs the Level 2 Gateway 1401 that it has set up a good broadband link, and the Level 1 Gateway initiates a billing record for the call. Alternatively, if the PVC controller 1420 informs the Level 1 Gateway 1230 that it could not establish the broadband connection, the Level 1 Gateway passes that information on to the Level 2 Gateway 1401 and provides an appropriate message for display by the DET 1217 informing the customer.

During the communication session between the subscriber and the VIP 1400, the DET can transmit control signaling upstream through the ONU 1210 the HDT 1180 and the X.25 data network to the Level 2 Gateway 1401. The Level 2 Gateway can also send signaling information, such as control data and text/graphics, downstream through the same path to the DET 1217. For downstream transmission, the server 1403 will provide ATM cells with an appropriate header. The ATM switch 1410 will route the cells using the header and transmit those cells over fiber 1415 to the HDT serving the requesting subscriber. The HDT 1180 will recognize the header as currently assigned to the particular DET 1217 and will forward those cells through the downstream fiber of pair 1190 and the ONU 1210 to that DET, in essentially the same manner as for broadcast programming.

When a broadband session ends, e.g. as indicated by an exchange of appropriate messages between the DET 1217 and the Level 2 Gateway 1401, the Level 2 Gateway instructs the Level 1 Gateway 1230 to tear down the broadband connection. The instruction includes the customer's billing telephone number and the server port identification for the VIP port used for the broadband communication. In response, the Level 1 Gateway 1230 stops the billing timing for that broadband session and transmits and instruction through the PVC controller 1420 to tear down the broadband connection between the server port and the customer's broadband port. As in the network of FIG. 1, the Level 1 Gateway creates a log record of the interactive broadband call for purposes of billing the VIP 1400 for the broadband connect time.

The Full Service Network illustrated in FIG. 2 will also provide narrowband transport for voice and narrowband data services. A digital switch 1310 or an analog switch 1330 will provide standard type plain old telephone service (POTS) for customers of the Full Service Network. The digital POTS switch provides a DS-1 type digital input/output port through interfaces conforming to either TR008 or TR303. The output may go to a digital cross-connect switch (DCS) 1320 for routing to the various HDT's or directly to a multiplexer (MUX) 1325 serving a particular HDT. The MUX 1325 may also receive telephone signals in DS-1 format from the analog switch through a central office terminal 1333. The central office terminal 1333 converts analog signals to digital and digital signals to analog as necessary to allow communication between the analog switch 1330 and the rest of the network.

The MUX 1325 serves to multiplex a number of DS-1 signals for transmission over one fiber of an optical fiber pair 1335 to the HDT 1180 and to demultiplex signals received over the other fiber of the pair 1335. The fiber pairs between the HDT 1180 and the ONU's 1210 will also have a number of DS-1 channels to carry telephone and narrowband data signals to and from the subscriber's premises. The subscribers' drops 1215 include both a coaxial cable and one or more twisted wire pairs. In addition to the video services discussed above, the ONU will provide telephone signals and appropriate power to the subscribers' premises over the twisted wire pairs connected to subscribers' telephone sets 1219. The ONU's will also provide two-way narrowband data communication to the DET's in narrowband channels over coaxial cable.

Hybrid Fiber—Coax

Figure 3:
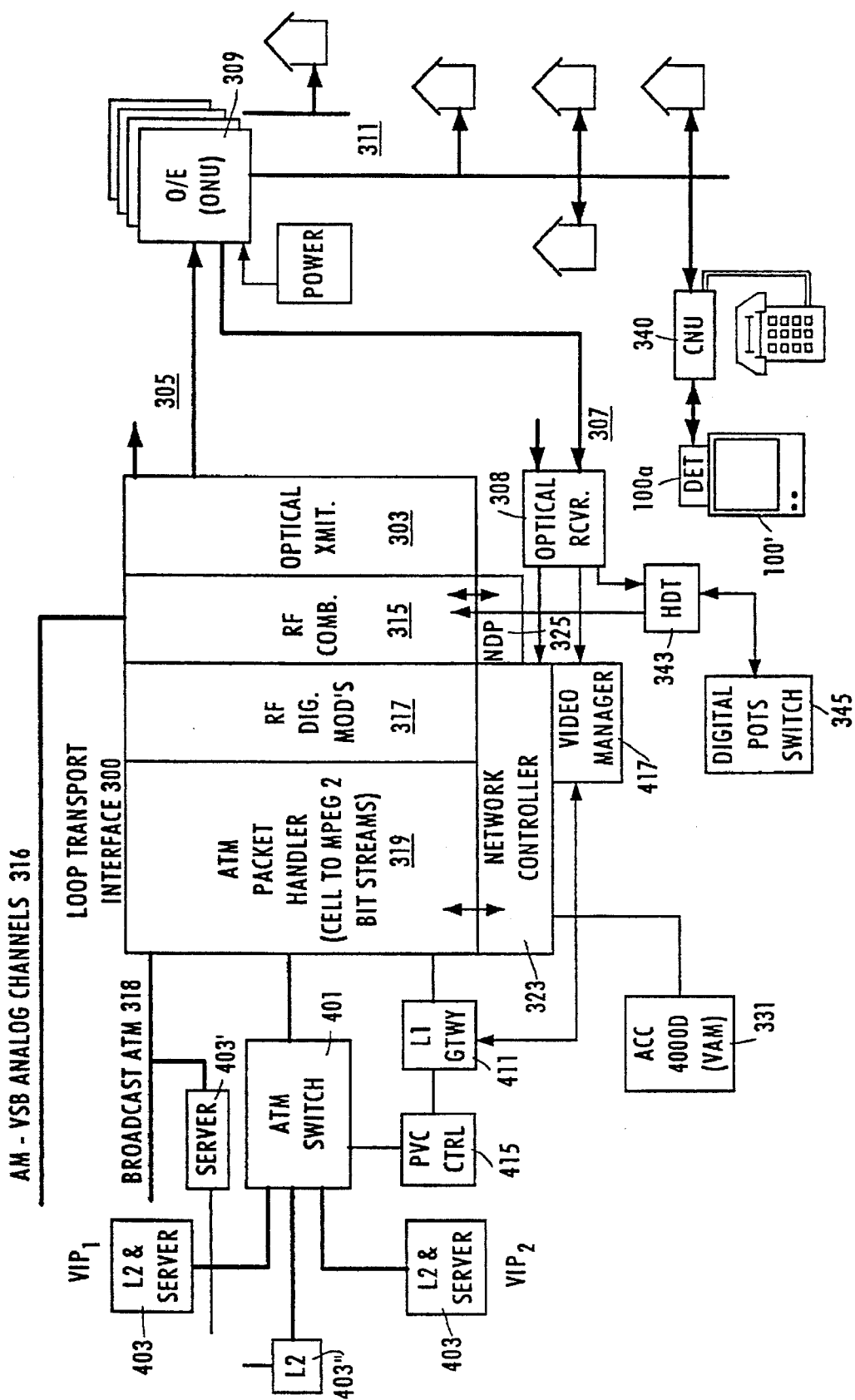
FIG. 3 illustrates a hybrid fiber coax network architecture utilizing the Level 1 Gateway in a manner adapted to the present invention.

FIG. 3 depicts an alternate implementation of a further video network utilizing a Level 1 Gateway in accordance with the present invention. The network of FIG. 3 is a hybrid fiber-coax system which provides RF transport of both analog and digital broadband services. The illustrated network provides broadcast video distribution, archival video services and interactive multi-media services as well as plain old telephone service.

Within an area containing a large number of subscribers, such as a LATA, a telco deploys a number of Loop Transport Interfaces 300, only one of which appears in the drawing (FIG. 3). At least as currently envisaged, each Loop Transport Interface 300 will be located in a telco central office. In an area serviced through multiple central offices, several different central offices would each have a Loop Transport Interface similar in structure to the Interface 300 depicted in FIG. 3. In some respects, each Loop Transport Interface will serve as the headend of an otherwise conventional optical fiber trunk and coaxial cable type CATV distribution network.

In the Loop Transport Interface 300, a laser type optical transmitter 303 transmits downstream signals through fibers 305 to optical to electrical nodes referred to as "optical network units" or ONU's. The laser operates in a linear mode in the range of 5–750 MHz. The transmitter has an optical splitter and can transmit to several ONU nodes 309. Each ONU 309 performs optical to electrical conversion on the downstream signals and supplies downstream RF electrical signals to a coaxial cable distribution system 311.

The optical transmitter receives and transmits signals from an RF (radio frequency) combiner 315. The combiner 315 combines and levelizes RF signals from several sources to produce the appropriate signal spectrum for driving the optical transmitter 303. One set of signals supplied to the RF combiner 315 will be group of AM—VSB (amplitude modulated vestigial sideband) analog television signals from one or more appropriate sources not separately shown. Such signals are essentially "in-the-clear" CATV type broadcast signals capable of reception by any subscriber's cable ready television set.

The analog television signals are broadcast from the optical transmitter 303 through the tree and branch optical and coax distribution network to provide "basic" CATV type service to all subscribers on the network. For subscribers choosing only analog television service who do not have a cable ready television, the Network operating company offers a standard CATV type analog frequency converter, or the subscriber could choose to purchase a converter on the open market. The network interface module in the DET 100a will also include a tuner that permits subscribers to the digital services to receive the analog broadcast channels through the same equipment used for the digital services.

The Network depicted in FIG. 3 also provides transport for digitized and compressed audio/video programming, both for certain broadcast services and for interactive services, such as video on demand. Such programming will be encoded and compressed in MPEG-2 or other format. As discussed in more detail below, the present invention permits specific use of MPEG encoded materials to offer a variety of interactive services without continuously utilizing a full MPEG encoded broadband channel to transport information to the subscriber's DET 100'.

In the illustrated Network, the MPEG encoded video is transported to each Loop Transport Interface using asynchronous transfer mode (ATM) transport and switching. As noted above, ATM information is organized into cells each comprising a header, primarily for identifying cells relating to the same virtual connection, and an information field or "payload". The ATM cell header information includes a virtual circuit identifier/virtual path identifier (VCI/VPI) to identify the particular communication each cell relates to. For example, for broadcast signals, the VCI/VPI will identify a particular program channel. For a point to point transmission, e.g. for video on demand, the VCI/VPI in each header of the ATM cells would effectively identify a specific end point of the virtual communication link.

In the illustrated network, digital broadcast service signals 318 in MPEG encoded form and arranged in ATM cell packets are applied to an ATM packet handler 319 in the Loop Transport Interface 300. These broadcast service signals originate in one or more broadcast VIP's ATM servers which are essentially the same structure as the servers/sources 1101, 1101 shown in FIG. 2. The ATM broadcast services will carry premium service type programming. The ATM broadcast signals may originate from any appropriate source (not shown). For certain interactive services which utilize one digitized channel to provide limited downstream transport to a large number of subscribers, the ATM broadcast cell stream signals originate from a server 403', as discussed in more detail below. Fully interactive broadband digital signals, in MPEG—ATM format, are also applied to the ATM packet handler from an ATM switch 401. The ATM packet handler 319 terminates all ATM cell transport through the Network. This handler receives the ATM cell streams and converts the cell payload information into MPEG 2 bit streams.

In addition to the analog broadcast signals, the RF combiner 315 which prepares signals for downstream transmission by the optical transmitter 303 receives a variety of other analog RF signals from a group of RF digital modulators. The RF analog outputs from the modulators carry digital broadband information. The content for the digital RF modulators comes from the ATM packet handler 319. A network controller 323 and an associated network data processor (NDP) 325 use the VCI/VPI header from the ATM cells to control the ATM packet handler 319 to route the MPEG bit streams to the appropriate ones of the digital RF modulators 317.

U.S. Pat. No. 5,231,494 to Wachob, the disclosure of which is incorporated herein in its entirety by reference, teaches quadrature phase shift keyed (QPSK) modulation of a plurality of video, audio and data signals into a single data stream within a standard six MHz channel allocation for transmission over a CATV type distribution network. The currently preferred implementation uses 64 QAM (quadrature amplitude modulation) or 16 VSB (vestigial sideband) modulation techniques in the RF modulators 317 in the Loop Transport Interface 300. Using 64 QAM, 4 channels of 6 Mbits/s MPEG encoded digital video information can be modulated into one 6 MHz bandwidth analog channel. Similarly, 16 VSB yields 6 channels of 6 Mbits/s MPEG encoded digital video information modulated into one 6 MHz bandwidth analog channel. Each RF modulator produces a 6 MHz bandwidth output at a different carrier frequency.

The 6 MHz bandwidth RF signals from the modulators 317 are supplied to the optical transmitter 303 for downstream transmission together in a combined spectrum with the AM—VSB analog television signals 316. The downstream transport of the digital programming is an RF transmission exactly the same as for the analog basic service channels, but each of the channels from the RF modulators 317 contains 4 or 6 digitized and compressed video program channels, referred to hereinafter as "slots". The 6 Mhz digital program channels will be carried through the fiber and coaxial system in standard CATV channels not used by the analog basic service programming. The ONU 309 is essentially transparent to both the analog basic service channels and the channels carrying the digital programming and supplies all of the signals as a combined broadcast over the coaxial cable network 311. The optical fiber 305 from the transmitter, the ONU's 309 and the coaxial distribution systems 311 therefor provide a broadcast network transporting all downstream programming to all subscriber premises serviced thereby.

At the subscriber premises, a network interface module (NIM) couples the set-top device or digital entertainment terminal (DET) 100a to a drop cable of the coaxial distribution network 311. In this Network configuration, the NIM includes an analog frequency tuner controlled by a microprocessor to selectively receive the RF channel signals, including those channels carrying digital information. The NIM also includes a QPSK, QAM or VSB demodulator to demodulate a selected one of the digitized program signals carried in one of the digital slots within a received 6 MHz channel and will perform a forward error correction function on the demodulated data. The digital audio/video signal processor 2125 within the DET decompresses received video signals, generates graphics display information and performs digital to analog conversion to produce output signals compatible with a conventional television set 100', exactly as in the earlier embodiments.

The analog tuner in the NIM will tune in all channel frequencies carried by the network, including those used for the analog broadcast services. The DET 100a includes a bypass switch or the like and an analog demodulator to selectively supply analog signals from the basic service channels directly to the audio/video output terminals or to the modulator, to provide signals to drive a standard television receiver. The DET 100a therefore can be used as a frequency converter for reception of the analog signals.

As preferred in all embodiments, each DET 100a includes a remote control and/or keypad to receive various selection signals from a user. At least in response to certain user inputs, such as selection of a pay per view event, the DET will relay data signals upstream over a signaling channel on the coaxial cable to the ONU 309. The actual transmission of any such data signals upstream from the DET 100a occurs in response to a polling of the DET by the ONU 309. The ONU 309 combines upstream data signals from the DET's serviced thereby and transmits those signals upstream over another optical fiber 307 to an optical receiver 308 in the Loop Transport Interface 300. Each DET 100a may transmit data on a different carrier frequency, in which case the network controller knows which DET sent particular data based on the received frequency channel. Alternatively, for interactive services, the DET may transmit a unique identification code with the upstream message.

Certain digital program signals carried on the network may be encrypted using encryption technology and key codes. Details of specific encryption algorithms, the key codes and the precise techniques for downloading the key codes to the DET's are well known to those skilled in the art and familiar with the relevant patents and literature.

In the implementation of the network illustrated in FIG. 3, an ACC 4000D 331 serves as a video administration module (VAM). Obviously other equivalent products may be substituted. The ACC 4000D or VAM performs set top management and specific program access control functions. In particular, service profiles for each customer on the network and their DET's are set up and stored within the Level 1 Gateway 411. The Level 1 Gateway 411 may also provide an interface to appropriate billing systems (not shown) for some broadcast services, such as pay per view. For ATM broadcast services, when a subscriber first signs up, a portfolio of channels subscribed to by that customer is established in the subscriber's profile data within the VAM 331. Based on this profile data, the VAM will download a service map into the subscriber's DET 100a. The downstream transmission portion of the network provides an out-of-band downstream signaling channel to the DET's, for example for the downloading of the service map information from the VAM 331 to each DET 100a. This downstream signaling channel also carries signals for controlling software downloading and/or selection of certain channels or frames for decoding in interactive services.

All digital broadcast service signals are broadcast into each subscriber's premises, and each DET 100a includes means for receiving and decoding each such digital broadcast service channel, as discussed above with regard to FIG. 1. The microprocessor in the DET 100a controls access to any of these channels based on the downloaded map information stored in the system memory. For example, if one subscriber requests HBO, and that subscriber has paid to subscribe to HBO, the subscriber's DET 100a will contain map information instructing it to tune the RF channel and select and decode the digital program slot carrying HBO for display on the subscriber's television set 100'. However, if a requesting subscriber has not paid for HBO, the downloaded service map will not provide the requisite data for tuning and decoding of that channel.

The illustrated Network also offers pay per view services through the ATM broadcast program channels 318. A user selects a pay per view event by operating the DET 100a. The DET 100a transmits a purchase message upstream through the Loop Transport Interface 300 to the Level 1 Gateway 411. If the authorization data in the subscriber's profile in the Level 1 Gateway indicates that the DET identification is valid and the subscriber is authorized to purchase such events, the Level 1 Gateway instructs the video manager 417 to authorize reception (and provide a decryption key if needed). In response to an appropriate instruction from the Level 1 Gateway 411, the DET 100a decodes the pay per view event in essentially the same manner as for other premium services carried on the ATM broadcast channels 318, as outlined above. If the decryption key is needed, the Level 1 Gateway 411 actually instructs the video manager 417 to instruct the VAM 331 to transmit the key to subscriber's DET 100a.

The implementation of the network illustrated in FIG. 3 also provides telephone service. Between the optical network unit and the subscriber premises, the 700–750 MHz portion of the spectrum on the coaxial cable will carry the telephone signals. This allocated spectrum provides transport for 24 DS0 telephone channels. Each subscriber premises will have telephone interface referred to as a Cable Network Unit (CNU) 340 coupled to the coaxial cable which serves to couple two-way signals between a twisted wire pair into the home and the telephone frequency channels on the coaxial cable 311.

Carrier frequencies used for telephone services may be individually assigned to particular subscriber's CNU's. Also, the telephone signal spectrum is carried on the same two fibers that carry the video and the upstream signaling between the Loop Transport Interface and the ONU. Upstream telephone signals are applied from the optical receiver 308 to a host digital terminal (HDT) 343 which provides an interface to a standard digital telephone switch 345. Downstream telephone signals from that switch pass through the HDT 343 to the RF combiner 315 for transmission in the 700–750 MHz frequency range over the fiber to the ONU 309 and the coaxial cable distribution system 311.

In an alternate implementation not shown, the Loop Transport Interface 300 would dynamically allocate the DS0 channels on the coaxial cable system 311 on a time-sharing basis, in essentially the same manner as in mobile radio systems. Two additional fibers and a second optical transmitter and receiver pair would carry the two-way telephone signals to and from the ONU 309. Because of the use of the separate optical links for telephone service in this alternate implementation the HDT and telephone switch need not be closely associated or collocated with any particular one of the Loop Transport Interfaces.

Battery power for telephone service and for the various interfaces will be applied through the ONU's 309 and supplied downstream over the coaxial cable.

The implementation of the network illustrated in FIG. 3 offers access to video information providers (VIP's) for interactive broadband services, such as video on demand. For archival services and many other interactive services, each VIP has a Level 2 Gateway and some form of broadband information file server 403. The ATM switch 401 provides communications links between the Loop Transport Interfaces 300 and the Level 2 Gateways and file servers 403. Customer access to the VIP's is controlled through one or possibly more programmed computer or processor elements performing the processing functions of the Level 1 Gateway 411. A permanent virtual circuit (PVC) controller 415 and a video manager 417 respond to signals from the Level 1 Gateway to control the point to point routing through the Network.

The PVC controller 415 stores data tables defining all possible virtual circuits through the ATM switch 401 and the Loop Transport Interface 300 serving each DET terminal of a customer subscribing to each particular provider's services. These data tables define the header information and the switch port to the packet handlers needed to route cells to the correct Loop Transport Interface. The video manager 417 stores similar data tables identifying the transmission fiber ports, RF channels and multiplexed digital channel slots which may be used to transport each data stream processed by the ATM packet handler 319 through the fiber 305 to the appropriate ONU 309 serving each DET. The data tables in the PVC controller 415 and the video manager 417 thus define "permanent virtual circuits" between the VIP's equipment 403 and the DET's 100a.

For a full, broadband interactive session, the subscriber operates the DET 100a to interact with the Level 1 Gateway 411 and select a VIP in a manner similar to the operation in the network of FIG. 1. The PVC controller 415 responds to instructions from the Level 1 Gateway by activating the ATM switch 401 to establish a downstream virtual circuit path between a port of the VIP's server and the ATM packet handler within the Loop Transport Interface 300 servicing a subscriber requesting a call connection to the particular VIP. The video manager 411 assigns a particular one of the digitized video channel slots in a digital program type RF channel to carry the particular point to point communication. Specifically, the video manager controls the ATM packet handler 319 to route MPEG data recovered from the ATM cells for the particular point to point communication to the port for one of the RF modulators 317 so that the modulator will include the MPEG data in the assigned digital channel slot within a particular 6 MHz RF channel. The video manager 417 also transmits a signal downstream through the signaling channel to the subscriber's DET 100a instructing the DET to tune to the particular RF channel and decode MPEG data from the specifically assigned digital channel within that RF channel. Similar dynamic assignments of RF channels on a CATV system to individual terminals for interactive services are disclosed in U.S. Pat. No. 5,220,420 to Hoarty et al. and U.S. Pat. No. 5,136,411 to Paik et al., the disclosures of which are incorporated herein in the entirety by reference.

Concurrently, the Level 1 Gateway 411 would instruct the PVC controller 415 to control the ATM switch 401 to establish an upstream virtual circuit for control signals sent from the DET 100a up through the fiber-coax network and receiver 308 to the VIP's level 2, gateway. The combination of upstream and downstream, point to point channels are used for downloading of operating system and applications software and for interactive service communications in essentially the same manner as in the Video Dial Tone Network of FIG. 1.

As noted above, the Level 1 Gateway 411 receives status and failure notifications as part of its ongoing operations. These functions of the Gateway 411 are quite similar to those of the Gateway 212 in the network of FIG. 1 except that the Gateway 411 receives event notifications from more elements of the network. Also, in the presently preferred embodiment of the network of FIG. 3, the function of monitoring communications between the loop transport interface 300 and individual subscribers' DET's 100*a* is an automatic function of the video manager 417. In such an embodiment, there is no longer a need for the video provider service center (VPSC).

The video manager monitors 417 operations of the loop transport interface 300. As part of its monitoring function, the video manager 417 also determines the status of communications to each DET 100*a*. As such, the video manager automatically knows the status of all components between the input ports to the loop transport interface and the output ports of the DET's 100*a*.

A variety of known techniques can be used to check the status of communications to the individual DET's. For example, the video manager 417 could periodically transmit a status interrogation signal to each DET 100*a*, through the out-of-band signaling channel. If currently operable, the DET would transmit a status message back upstream through the signaling channel informing the manager 417 of the DET's status, e.g. operable but idle or operable and actively in-service. A DET 100*a* detecting some problem could transmit a fault signal upstream through the signaling channel to the video manager 417, either immediately in response to fault detection or in response the next periodic interrogation by the video manager. The video manager 417 would also interpret a failure of a DET 100*a* to respond to an interrogation or to confirm any other message sent to the DET within a predefined period of time as a fault condition.

During the call set up processing, the Level 1 Gateway 411 may receive an indication from the PVC controller 415 and/or the video manager 417 that one or both can not establish a desired broadband connection. The PVC controller 415 also monitors ongoing operations of the ATM switch 401, and the video manager 417 monitors communications through the loop transport interface 300 at all times, and each will inform the Level 1 Gateway 411 upon detection of any fault or interruption in any currently established broadband connection. The Level 1 Gateway 411 transmits notice of an inability to establish a desired broadband session through the signaling channel to the requesting DET 100*a*, using notices such as shown in FIGS. 2F and 2G depending on whether or not other VIP's are available to the particular subscriber at the time of the call. If the Level 1 Gateway 411 receives notice of a fault in an already established session, the Gateway 411 stops accumulating billing data for that session and transmits a message regarding the failure to the VIP's Level 2 Gateway. The Level 2 Gateway may provide an appropriate notice to the subscriber through the signaling link, if that portion of the session is still operative. Alternatively, the Level 1 Gateway may transmit an appropriate display notice to the DET 100*a* through the signaling channel.

When the Level 1 Gateway 411 instructs the PVC controller 415 and the video manager 417 to tear down a broadband communication session, the Gateway 411 expects responses from both of those controllers 415, 417 within a predetermined time interval. If either the PVC controller 415 or the video manager 417 does not respond within the predetermined time interval, the Level 1 Gateway 411 will send an ABORT message to the non-responsive controller 415 or 417 to cancel the original session establishment message, and the Gateway 411 will also record the failure in an alarm file.

Overview of the Digital Entertainment Terminal

The DET will connect to a number of different types of networks, such as the Video Dial Tone Network shown in FIG. 1, and more advanced video distribution networks disclosed in commonly assigned application Ser. No. 08/250,792 filed May 27, 1994, entitled "Full Service Network" (680-080), the disclosure of which is incorporated herein entirely by reference.

Figure 4:
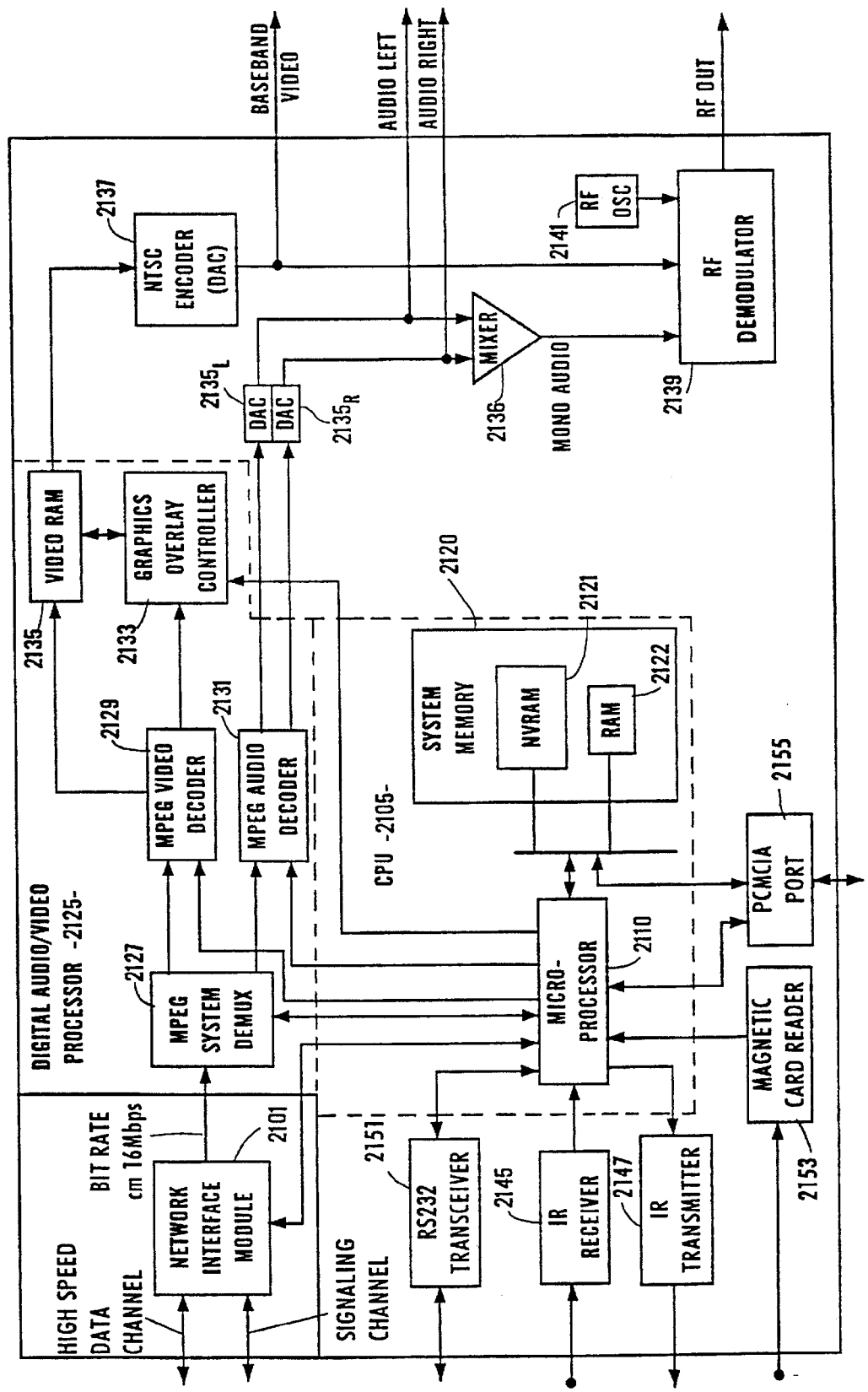
FIG. 4 illustrates a digital entertainment terminal which may be utilized with the present invention.

Referring to FIG. 4, for each different type of network, the DET 2100 will include a network interface module 2101 providing the actual physical connection to the particular type of network. The network interface module 2101 will also perform any format conversion necessary between signal formats utilized by the network and signal formats used within the DET 2100. The module 2101 presents two connections to the rest of the DET, a high bit rate broadband connection and a low bit rate signaling connection. The broadband connection is a one-way downstream only connection, but the low bit rate signaling connection is a two-way connection. In the Video Dial Tone Network of FIG. 1, the network interface module would provide corresponding connections to an in home ADSL multiplexer unit. Alternatively, the ADSL unit could be included as one or more additional chips within the DET. In other networks, for example using coaxial cable or optical fiber, the network interface module would include means to multiplex and demultiplex signals for transmission/reception over the coaxial cable or optical fiber. The network interface module would also include the means to physically connect to the particular network. For example, in a fiber to the home network, the module would include a means for two-way conversion between electrical and optical signals and connections to one or more optical fibers for the necessary two-way transmission.

The network interface module 2101 takes the form of a plug in module. In the preferred embodiment, the module 2101 would be similar to a daughter board or option card which can be plugged into a back plane of a personal computer (PC). In such an embodiment, typically a technician could replace the module in either the field or the shop, to modify a DET to connect to and communicate over a different network, and the technician would modify associated communications control software in the system memory. Alternative implementations may use a user replaceable cartridge type network interface module, similar to a video game cartridge, which may include memory in the module for storage of the communications control. As a further alternative, the network interface module could include a digital signal processor controlled by the CPU of the DET and input/output connections compatible with all of the digital broadband networks currently available. The downloaded operating system software stored in the system memory of the DET would control operations of the digital signal processor to send and receive signals in accord with the particular network the subscriber chooses to connect the DET to.

The DET 2100 includes a CPU 2105, comprising a 386 or 486 microprocessor 2110 and associated system memory 2120. The system memory 2120 includes at least 2 mbytes of volatile dynamic RAM 2122 and 1 mbyte of non-volatile RAM 2121. The microprocessor 2110 includes a small amount of ROM (not shown) storing "loader" programming needed to control wake-up. An EPROM memory (not shown) also may be added.

A digital audio/video signal processor 2125, controlled by the CPU 2105, produces digital uncompressed audio and video signals from the audio and video MPEG encoded packets received from the network through the interface module 2101. The audio/video processor 2125 includes an MPEG system demultiplexer 2127, an MPEG video decoder 2129, an MPEG audio decoder 2131, a graphics overlay controller 2133 and at least two frames (e.g. 8 mbytes) of video RAM 2135.

The MPEG system demultiplexer circuitry 2127 recognizes packets in the MPEG data stream received over the broadband channel through the network interface module 2101 and routes the packets to the appropriate components of the DET. For example, the MPEG system demultiplexer 2127 circuitry recognizes audio and video packets in the MPEG data stream and routes those packets to the decoders 2129, 2131, respectively.

The MPEG video decoder 2129 decompresses received video packet signals to produce a digital video signal, and the MPEG audio decoder 2131 decompresses received audio packets to produce left and right digitized stereo signals. For at least some functions, the MPEG decoders 2129, 2131 may be controlled in response to signals from the microprocessor 2110. The MPEG video decoder 2129 will internally include at least two frames (e.g. 8 mbytes) of RAM (not separately shown) for use as a frame reorder buffer during the MPEG video decoding process, and the MPEG audio decoder 2131 also may include some buffer memory.

The video RAM 2135 is not a specialized "video RAM" as that term is sometimes used in the television art. The RAM 2135 is actually a standard digital data RAM, of appropriate size, which is used in the DET to store digitized frames of video data. The RAM within the MPEG video decoder 2129 likewise consists of standard digital data RAM.

The graphics display generator produces displays of text and graphics data, such as the initial turn-on selection menu received over the signaling channel, in response to instructions from the CPU 2105. The video RAM 2135 sequentially receives each frame of digitized, uncompressed video information, as output from the MPEG video decoder 2129. The video RAM 2135 also receives digital information and read/write control signals from the graphics overlay controller 2133 representing the several planes of text and graphics information and combines that information with the frames of decompressed video to produce composite video frames.

The graphics overlay controller 2133 and the video RAM 2135 actually cooperate to manipulate five different planes of video information, four of which can be active at any one time, to produce the composite video fame output signals. The individual planes comprise the decoded MPEG video frames, a cursor, two graphics/text image planes manipulated by the microprocessor 2110 and a backdrop plane. The backdrop plane would be switched in to replace the plane representing the decoded MPEG video frames, e.g. to present a blue background instead of the MPEG video background.

When there are no graphics or text, the composite frames would correspond entirely to the uncompressed received video frames output by the MPEG video decoder 2129. When no received video frames are to be output, either when none are received or when they are to be entirely replaced, the information from the graphics overlay generator 2133 would specify a background and the active planes of text or graphic information. When received video frames are combined with text and/or graphics, the composite video frames include the uncompressed received video frames with selected pixels thereof replaced with graphics or textual data display pixels specified by the graphics overly controller 2133. In this last situation, the graphics overlay controller would deactivate the backdrop plane.

The DET also includes audio and video digital to analog converters and appropriate drivers to produce output signals compatible with a conventional television set. Specifically, the converter and driver circuitry of the DET 2100 includes audio digital to analog converters (DAC's) $2135_L$, $2135_R$, an audio mixer 2136, an NTSC encoder 2137, and an RF modulator 2139.

The DAC's $2135_L$ and $2135_R$ receive the uncompressed left and right digitized audio signals output by the MPEG audio decoder 2131. In response, the DAC's $2135_L$ and $2135_R$ produce baseband analog audio signals for output to individual baseband output terminals. The audio mixer 2136 also receives the baseband audio signals from the DAC's $2135_L$ and $2135_R$. The mixer 2136 combines the left and right analog audio signals to produce a monaural audio signal as the audio input to modulator 2139.

The NTSC encoder 2137 also performs a digital to analog converter (DAC) function. In response to the digitized video output signals from the video RAM 2135, the NTSC encoder 2137 produces a baseband analog video signal in standard NTSC format. The baseband NTSC video signal is supplied to an output terminal of the DET 2100. The baseband NTSC video signal is also supplied to the RF modulator 2139. The RF modulator 2139 responds to the mono audio signal, the NTSC video signal and an RF signal from a local RF oscillator 2141, to produce a standard RF television signal on an available TV channel, typically channel 3 or channel 4.

The type of connection of the DET 2100 to the television set depends on the capabilities of the user's television set. If the user has a monitor type television capable of receiving baseband video and stereo audio inputs, the appropriate terminals of the television would connect directly to the video and audio output terminals of the DET 2100. If the subscriber does not have such a television monitor, then the RF output of the modulator 2139 would be connected to the cable or antenna input connection of the television, e.g. by coaxial cable. Alternatively, the digitized video and audio may go to separate output terminals (not shown) for connection to inputs of digital display devices, for example, for high definition television (HDTV) sets.

In the embodiment illustrated in FIG. 4, the DET 2100 includes an infrared (IR) receiver 2145. The (IR) receiver 2145 responds to inputs signals from a user operated IR remote control device (not shown) similar to that used today for controlling televisions and video cassette recorders. In response to the IR signals, the receiver 2145 produces corresponding digital data output signals. The microprocessor 2110 interprets the digital data signals by the IR receiver 2145 as input commands. The precise interpretation of specific command signals can vary based on the downloaded applications programming and/or operating system software stored in the system memory 2120. In response to the input commands, the microprocessor 2110 controls cursor position and alphanumeric information displayed as graphics and text on the associated television set. The microprocessor 2110 will also respond to an appropriate input command from the user to formulate a message for upstream transmission though the network interface module 2101 and the signaling channel of the particular connected network.

The DET 2100 of the present invention may also include a number of additional interface devices. In the example illustrated in FIG. 4, the DET 2100 includes an IR transmitter 2147. The transmitter 2147 responds to digital data signals from the microprocessor 2110 and outputs corresponding IR signals for wireless transmission. The IR transmitter 2147 and IR receiver 2145 may operate together to provide a two-way wireless data communication link to some remote device, such as a personal data assistant (PDA) or pocket organizer or a sophisticated TV controller. A PDA or TV controller may be used to select channels, input data for upstream transmission and/or control of the NIM. Alternatively, the IR transmitter may send signals to a remote display device for use in a service not requiring the TV set. For example, in an audio on demand service, the IR transmitter would send display data to an LCD display located near the user's stereo system.

The illustrated DET also includes an RS-232 transceiver 2151 connected to the microprocessor 2110. An RS-232 port is a standardized two-way serial data interface typically used for connecting computers to peripheral devices, such as modems. In the present system, the RS-232 transceiver 2151 might provide a serial data connection to an external personal computer (PC), such that the DET permits communications between the PC and the Video Dial Tone network. Alternatively, this port might connect the DET to a printer, e.g. to print coupons during home shopping/browsing services. A hand-held diagnostic terminal would also connect to this port during servicing of the DET. The communications and protocols offered by the DET through the transceiver 2151 would be controlled by the operating system and applications program software downloaded into the system memory 2120.

FIG. 4 also shows the DET 2100 including a magnetic card reader 2153 connected to the microprocessor 2110. This reader 2153 could be used to scan credit card information encoded on magnetic strips on commonly available credit cards. In a home shopping and purchasing service, controlled by the downloaded software, the user would scan their own credit card through the magnetic card reader 2153 as part of the payment operations. The reader could also have magnetic write capabilities to perform debit card operations.

The illustrated DET 2100 further includes a personal computer memory-card interface adapter (PCMCIA) port 2155. This is a two-way interface for connection to and communication with a flash memory module, such as is now incorporated into advanced "smart card" devices. In a medical service, a user might communicate with a medical information database through the DET 2100 and the broadband network. The user's personal medical history information could be read from the smart card and subsequently updated on the smart card, through the PCMCIA port 2155. Another use of this port might involve communication to a connected video game system to download video game software to the video game system and/or play interactive video games. Although specified as a "memory" port and mapped by the CPU as part of its system memory space, the devices connected to this port 2155 can have other data processing capabilities, e.g. buffering and modem communication capability.

Hybrid Fiber—Coax—Wireless Distribution

Figure 8:
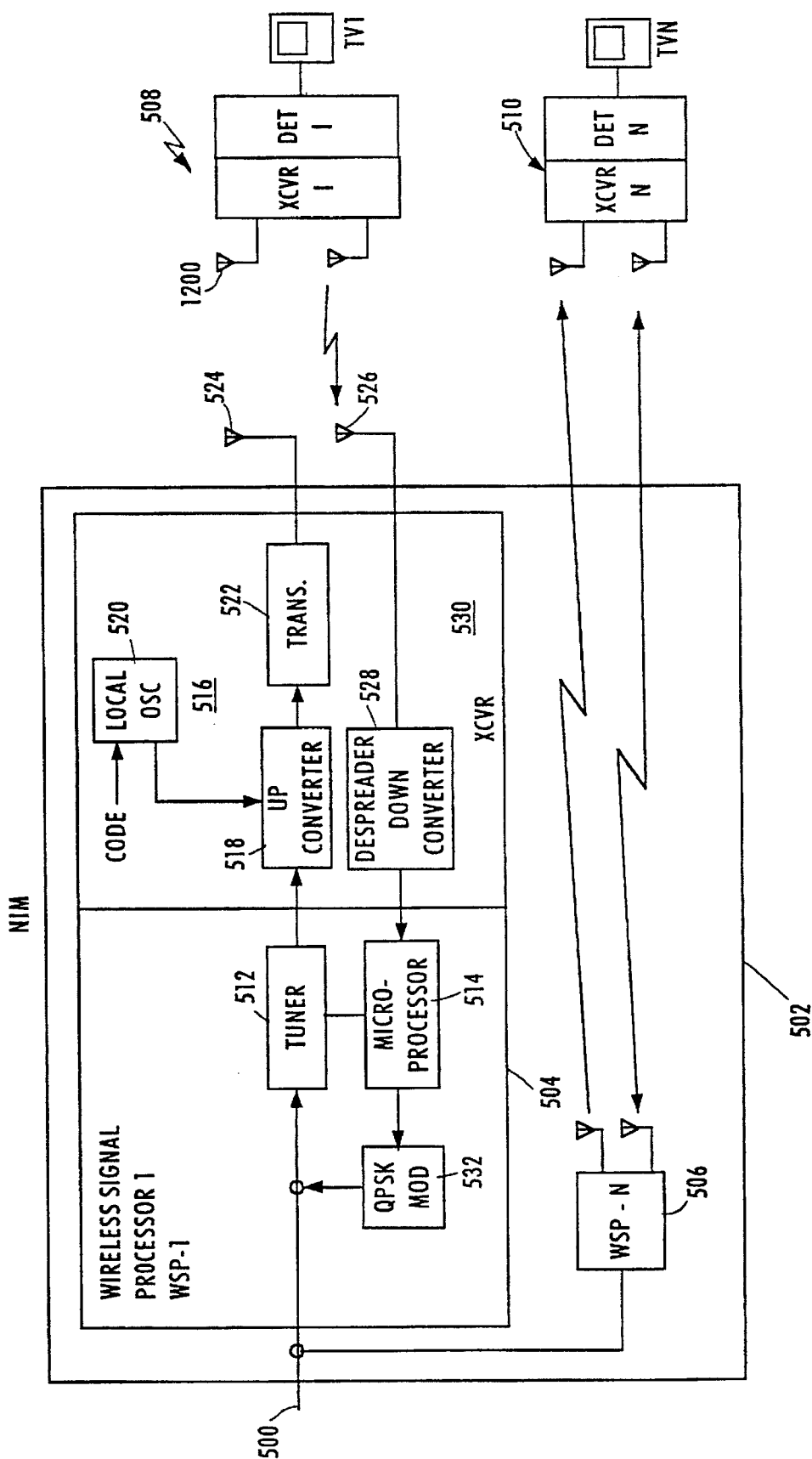
FIG. 8 illustrates another embodiment of implementation of the invention utilizing the type of network illustrated in FIG. 3.

FIG. 8 illustrates wireless premise distribution according to another embodiment of the invention. Referring to FIG. 8 there is shown at 500 a premise connection to a drop cable of a coaxial distribution network such as the network 311 in FIG. 3. In FIG. 8 a coaxial drop cable connection 500 is made to a premise Network Interface Module (NIM) 502 which is preferably located proximate the entry of the cable 500 to the premise. The NIM contains one or more Wireless Signal Processors such as Wireless Signal Processor (WSP) 1 shown at 504 and WSP N shown at 506. The NIM contains a number of such units equalling the number of premise television sets intended to be capable of independent choice of and interaction with the program and data content entering the premise via the connection 500. FIG. 8 illustrates two such television sets TV 1 and TV N, each connected to its own Transceiver/Digital Entertainment Terminal (DET) 508 and 510.

The Wireless Signal Processor (WSP) 502 includes an analog frequency tuner 512 controlled by a microprocessor 514 to selectively receive the RF channel signals, including those channels carrying digital information. The tuner 512 selects a 6 MHz channel or slot which contains four or more digitized and compressed video program and/or control channels. The tuner will tune in all channel frequencies carried by the network, including those used for the analog broadcast services. According to this embodiment of the invention the output of the tuner 512 is fed to a frequency hopping Code Division Multiple Access (CDMA) spread spectrum transmitter 516. This transmitter includes a spread spectrum generator and up converter 518 which is connected to a local oscillator or synthesizer 520 which operates in a frequency range to achieve the desired degree of up conversion of the IF signal from the tuner for on premise wireless distribution.

The frequency of the local oscillator or synthesizer 520 is controlled by a code which establishes the frequency hopping path for each signal fed to the up converter spread spectrum generator 518 by the tuner 512. It will be understood that each signal is provided with a unique code. Each code establishes a pseudo-random repetitive, periodic pattern which is known both to the spread spectrum generator and to the spread spectrum receiver. The output of the spread spectrum generator or up converter 518 is then fed to a transmitter amplifier 522 and to an antenna 524 for broadcast within the premise.

Spread spectrum communication systems can be implemented as multiple access systems in a number of different ways. One type of multiple access spread spectrum system is a code division multiple access (CDMA) system. CDMA spread spectrum systems may use direct sequence (DS-CDMA) or frequency hopping (FH-CDMA) spectrum spreading techniques. FH-CDMA systems can further be divided into slow frequency hopping (SHF-CDMA) and fast frequency hopping (FFH-CDMA) systems. In SFH-CDMA systems, several data symbols representing a sequence of data bits to be transmitted modulate the carrier wave within a single hop; in FFH-CDMA systems, the carrier wave hops several times per data symbol.

In a SHF-CDMA system, multiple communication channels are accommodated by the assignment of portions of a broad frequency band to each particular channel. For example, a communication between two communication units in a particular communication channel is accomplished by using a frequency synthesizer to generate a carrier wave in a particular portion of a predetermined broad frequency band for a brief period of time. The frequency synthesizer uses an input spreading code to determine the particular frequency from within the set of frequencies in the broad frequency band at which to generate the carrier wave. Spreading codes are input to the frequency synthesizer by a spreading code generator. The spreading code generator is periodically clocked or stepped through different transitions which causes different or shifted spreading codes to be output to the frequency synthesizer. Therefore, as the spreading code generator is periodically clocked, the carrier wave is frequency hopped or reassigned to different portions of the frequency band. In addition to hopping, the carrier wave is modulated by data symbols representing a sequence of data bits to be transmitted. A common type of carrier wave modulation used in SFH-CDMA systems is M-ary frequency shift keying (MFSK), where $k=\log_2 M$ data symbols are used to determine which one of the M frequencies is to be transmitted.

Multiple communication channels are allocated by using a plurality of spreading codes. As a result, transmitted signals are in the same broad frequency band of the communication channel, but within unique portions of the broad frequency band assigned by the unique spreading codes. These unique spreading codes preferable are orthogonal to one another such that the cross-correlation between the spreading codes is approximately zero. Particular transmitted signals can be retrieved from the communication channel by despreading a signal representative of the sum of signals in the communication channel with a spreading code related to the particular transmitted signal which is to be retrieved from the communication channel. Further, when the spreading codes are orthogonal to one another, the received signal can be correlated with a particular spreading code such that only the desired signal related to the particular spreading code is enhanced while the other signals are not enhanced. According to the preferred embodiment of the invention, frequency hopping spread spectrum is utilized.

The use of spread spectrum for the on premise distribution of the invention presents numerous advantages. A primary advantage is the dilution of the signal energy so that while occupying a large bandwidth, the amount of power density present at any point within the spread signal is very slight. The dilution may result in the signal being below the noise level of a conventional receiver, and thus invisible to it, while it can be received with a spread spectrum receiver. Another advantage is that the spread spectrum receiver can reject strong undesired signals while providing high quality reception of the signal having the correct spreading sequence. Multiple spread spectrum systems can operate independently of each other within the same band. Thus multiple independently tuned television sets may operation without interference within the same premise and in adjoining premises.

As described hereinabove in the description of the hybrid fiber coax network of FIG. 3, the DET associated with the TV set may transmit upstream messages of varying types. According to this embodiment of the invention those signals are transmitted by the Transceiver/DET as CDMA spread spectrum signals. These signals are received by the Wireless Signal Processor antenna 526 which is connected to a despreader and down converter 528. The despreader and down converter 528 is located in the receiver portion 530 of the transceiver constituted by the transmitter 516 and receiver 530. The despreader down converter 528 provides an upstream input to the microprocessor 514 which in turn delivers the upstream control signals to the coax connection 500 through a quadrature phase shift keyed (QPSK) modulator 532. Downstream signaling may be delivered over the coax connection 500 in the signals tuned by the tuner 512. This signal transmission is described hereinabove and in U.S. Pat. Nos. 5,220,420 and 5,136,411 there referenced. These signals are delivered with the channel or slot selected by the tuner 512 to the CDMA spread spectrum transmitter 516. While separate transmit and receive antennas 524 and 526 are illustrated it will be understood by those skilled in the art that a common antenna may be utilized.

Figure 9:
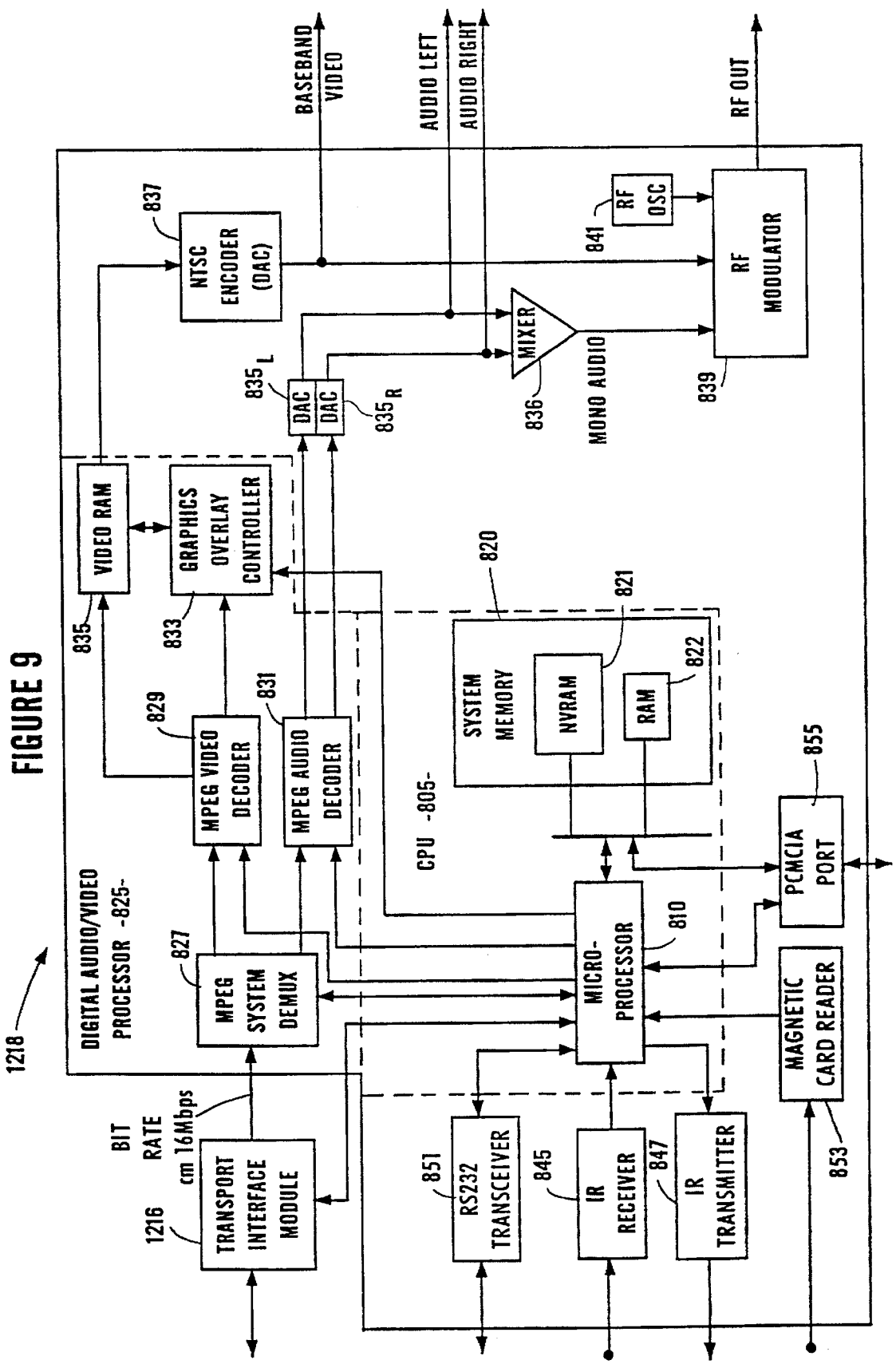
FIG. 9, illustrates a digital entertainment terminal which may be used with the embodiment of FIG. 8.

Referring to FIG. 9 there is shown a DET 1218 suitable for use in the DET portion of the Transceiver/DETs 508 and 510. The DET 1218 includes a CPU 805, comprising a 386 or 486 microprocessor 810 and associated system memory 820. The system memory 820 includes at least 2 Mbytes of volatile dynamic RAM 822 and 1 Mbyte of non-volatile RAM 821. The microprocessor 810 includes a small amount of ROM (not shown) storing "loader" programming needed to control wake-up. An EPROM memory (not shown) also may be added.

A digital audio/video signal processor 825, controlled by the CPU 805, produces digital uncompressed audio and video signals from the audio and video MPEG encoded packets received from the network through the interface module 1216. The audio/video processor 825 includes an MPEG system demultiplexer 827, an MPEG video decoder 829, an MPEG audio decoder 831, a graphics overlay controller 833 and at least two frames (e.g. 8 mbytes) of video RAM 835.

The MPEG system demultiplexer circuitry 827 recognizes packets in the MPEG data stream received over the broadband channel through the transport interface module 1216 and routes the packets to the appropriate components of the DET. For example, the MPEG system demultiplexer 827 circuitry recognizes audio and video packets in the MPEG data stream and routes those packets to the decoders 829, 831, respectively.

The MPEG video decoder 829 decompresses received video packet signals to produce a digital video signal, and the MPEG audio decoder 831 decompresses received audio packets to produce left and right digitized stereo signals. For at least some functions, the MPEG decoders 829, 831 may be controlled in response to signals from the microprocessor 810. The MPEG video decoder 829 will internally include at least two frames (e.g. 8 mbytes) of RAM (not separately shown) for use as a frame reorder buffer during the MPEG video decoding process, and the MPEG audio decoder 831 also may include some buffer memory.

The video RAM 835 is not a specialized "video RAM" as that term is sometimes used in the television art. The RAM 835 is actually a standard digital data RAM, of appropriate size, which is used in the DET to store digitized frames of video data. The RAM within the MPEG video decoder 829 likewise consists of standard digital data RAM.

The graphics display generator produces displays of text and graphics data, such as the initial turn-on selection menu received over the signaling channel, in response to instructions from the CPU 805. The video RAM 835 sequentially receives each frame of digitized, uncompressed video information, as output from the MPEG video decoder 829. The video RAM 835 also receives digital information and read/write control signals from the graphics overlay controller 833 representing the several planes of text and graphics information and combines that information with the frames of decompressed video to produce composite video frames.

The graphics overlay controller 833 and the video RAM 835 actually cooperate to manipulate five different planes of video information, four of which can be active at any one time, to produce the composite video frame output signals. The individual planes comprise the decoded MPEG video frames, a cursor, two graphics/text image planes manipulated by the microprocessor 810 and a backdrop plane. The backdrop plane would be switched in to replace the plane representing the decoded MPEG video frames, e.g. to present a blue background instead of the MPEG video background.

When there are no graphics or text, the composite frames would correspond entirely to the uncompressed received video frames output by the MPEG video decoder 829. When no received video frames are to be output, either when none are received or when they are to be entirely replaced, the information from the graphics overlay generator 833 would specify a background and the active planes of text or graphic information. When received video frames are combined with text and/or graphics, the composite video frames include the uncompressed received video frames with selected pixels thereof replaced with graphics or textual data display pixels specified by the graphics overly controller 833. In this last situation, the graphics overlay controller would deactivate the backdrop plane.

Under certain circumstances, the video RAM 835 also serves to freeze video frames. For example, when a video transmission ends for some reason, the RAM 835 will contain the video and associated graphics information for the frame last received and displayed. The DET can continue to output this frame as a still video output signal for some period of time.

The DET also includes audio and video digital to analog converters and appropriate drivers to produce output signals compatible with a conventional television set. Specifically, the converter and driver circuitry of the DET 1218 includes audio digital to analog converters (DAC's) $835_L$, $835_R$, an audio mixer 836, an NTSC encoder 837, and an RF modulator 839.

The DAC's $835_L$ and $835_R$ receive the uncompressed left and right digitized audio signals output by the MPEG audio decoder 831. In response, the DAC's $835_L$ and $835_R$ produce baseband analog audio signals for output to individual baseband output terminals. The audio mixer 836 also receives the baseband audio signals from the DAC's $835_L$ and $835_R$. The mixer 836 combines the left and right analog audio signals to produce a monaural audio signal as the audio input to modulator 839.

The NTSC encoder 837 also performs a digital to analog converter (DAC) function. In response to the digitized video output signals from the video RAM 835, the NTSC encoder 837 produces a baseband analog video signal in standard NTSC format. The baseband NTSC video signal is supplied to an output terminal of the DET 1218. The baseband NTSC video signal is also supplied to the RF modulator 839. The RF modulator 839 responds to the mono audio signal, the NTSC video signal and an RF signal from a local RF oscillator 841, to produce a standard RF television signal on an available TV channel, typically channel 3 or channel 4.

The DET 1218 of the present invention may also include a number of additional interface devices. In the example illustrated in FIG. 9, the DET 1218 includes an IR transmitter 847 that responds to digital data signals from the microprocessor 810 and outputs corresponding IR signals for wireless transmission. The IR transmitter 847 and IR receiver 845 may operate together to provide a two-way wireless data communication link to some remote device, such as a personal data assistant (PDA) or pocket organizer. Alternatively, the IR transmitter may send signals to a remote display device for use in a service not requiring the TV set. For example, in an audio on demand service, the IR transmitter would send display data to an LCD display located near the user's stereo system.

The illustrated DET also includes an RS-232 transceiver 851 connected to the microprocessor 810. An RS-232 port is a standardized two-way serial data interface typically used for connecting computers to peripheral devices, such as modems. In the present system, the RS-232 transceiver 851 might provide a serial data connection to an external personal computer (PC), such that the DET permits communications between the PC and the Video Dial Tone network. Alternatively, this port might connect the DET to a printer, e.g. to print coupons during home shopping/browsing services. A hand-held diagnostic terminal would also connect to this port during servicing of the DET. The communications and protocols offered by the DET through the transceiver 851 would be controlled by the operating system and applications program software downloaded into the system memory 820.

FIG. 9 also shows the DET 1218 including a magnetic card reader 853 connected to the microprocessor 810. This reader 853 could be used to scan credit card information encoded on magnetic strips on commonly available credit cards. In a home shopping and purchasing service, controlled by the downloaded software, the user would scan their own credit card through the magnetic card reader 853 as part of the payment operations. The reader could also have magnetic write capabilities to perform debit card operations.

The illustrated DET 1218 further includes a personal computer memory-card interface adapter (PCMCIA) port 855. This is a two-way interface for connection to and communication with a flash memory module, such as is now incorporated into advanced "smart card" devices. In a medical service, a user might communicate with a medical information database through the DET 1218 and the broadband network. The user's personal medical history information could be read from the smart card and subsequently updated on the smart card, through the PCMCIA port 855. Another use of this port might involve communication to a connected video game system to download video game software to the video game system and/or play interactive video games. Although specified as a "memory" port and mapped by the CPU as part of its system memory space, the devices connected to this port 855 can have other data processing capabilities, e.g. buffering and modem communication capability.

In the current implementation, the PCMCIA port 855 will carry 6 Mbits/s of data, but the port can be designed for higher speeds such as 20 Mbytes/s. Another use of this port would be for connection to an Ethernet card or other Local Area Network (LAN) card to permit data communications between the DET and one or more computers. The DET would provide the computers with communications services through the broadband network, for example to receive high speed downloads of new or updated software for those computers. Although similar functions are possible through the RS-232 transceiver 851, the data rate through the PCMCIA port 855 is much higher.

Figure 10:
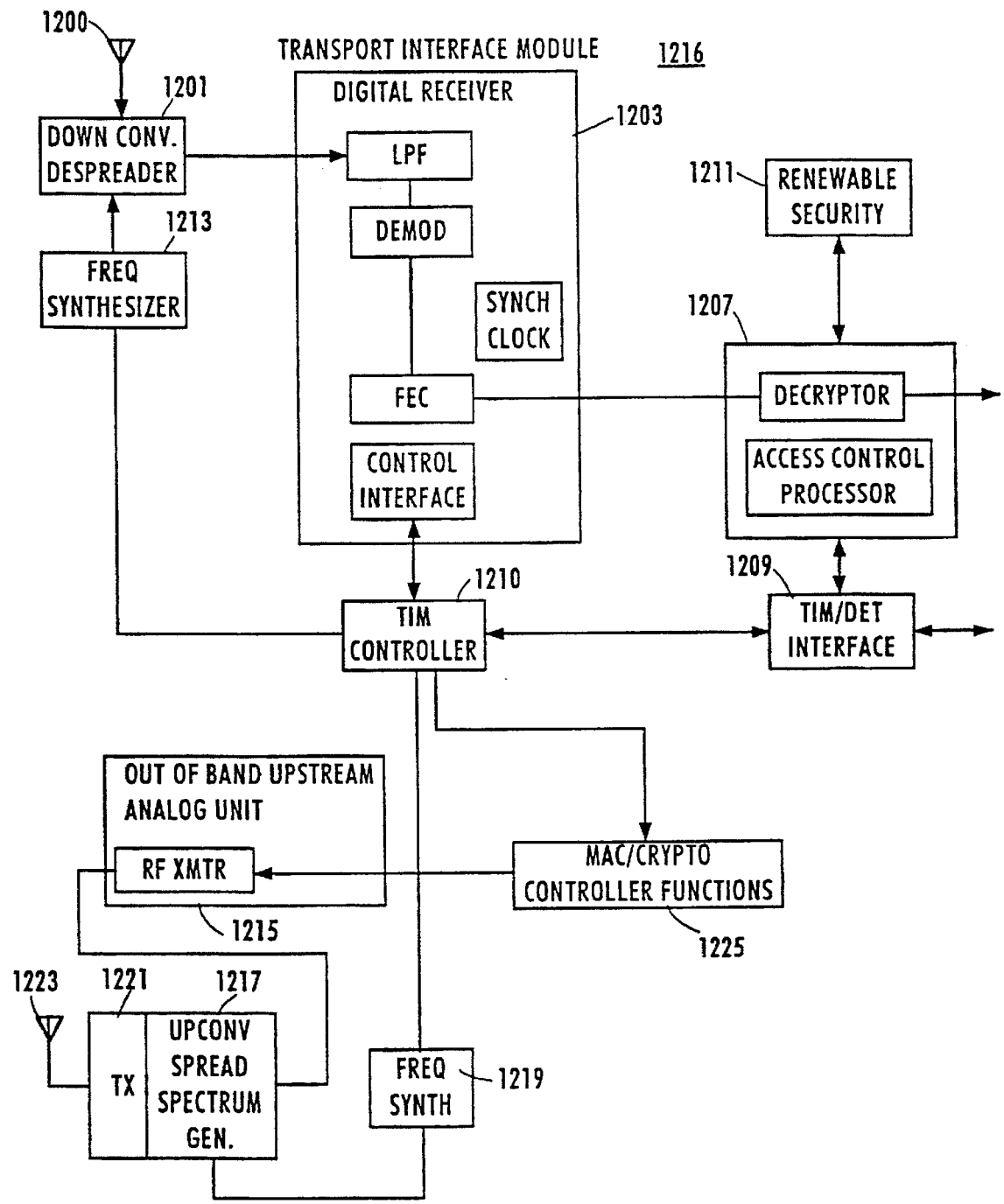
FIG. 10 illustrates an on premise implementation of the embodiment of the invention of FIG. 8.

FIG. 10 depicts a TIM (Transport Interface Module) 1216 for interfacing the DET 1218 to the Transceiver portion of the Transceiver/DETs 508 and 510 as shown in FIG. 8. The structure illustrated is based in part on the preference for the QAM modulation techniques for the digital video (broadband) signals and QPSK modulation techniques for the upstream signaling data (narrowband) signals in the disclosed network as used in this embodiment of the invention. The input to the TIM 1216 is the spread spectrum signal transmitted by the NIM antenna 524 and received by the TIM antenna 1200. The baseband audio video signals are selectively supplied as alternate outputs to the baseband output terminals and as alternate inputs to the RF output modulator 839 (see FIG. 9). The QAM demodulator block performs adaptive equalization, demodulation and forward error correction on signals in the digital channel slot selected by the RF tuner 512 in FIG. 8 and outputs a corrected serial baseband digital feed. The decryption processor 1207, when properly authorized by the video manager and the ACC-4000D in FIG. 3, decrypts packets identified by selected MPEG PIDs, as directed by the DET microprocessor, via the digital receiver interface 1203 and the TIM controller 1210. The composite MPEG transport multiplex with appropriately decrypted components is output from the TIM 1216 to the host DET's demultiplex and decompression circuitry as shown in detail in FIG. 9.

In the illustrated preferred embodiment, communication between the host microprocessor 810 and the TIM 1216 is via a dual port memory connected as the TIM/DET interface 1209 shown in FIG. 10. The shared memory provides mailboxes and buffer regions which are used to transfer messages and commands between the host microprocessor and the TIM 1216. Messages passing through this link include interactive traffic to the level 1 and 2 gateways, tuner control commands, specification of appropriate PIDs for decryption, general housekeeping data, etc.

FIG. 10 depicts in block diagram form the structure of a TIM 1216. The structure illustrated is based in part on the current preference for the 64 QAM modulation techniques for the digital video signals in transmission system of the type shown in FIG. 3. The input to the TIM is a spread spectrum signal which is down converted to the 50–450 MHz range in the despreader 1201. The despreader 1201 selects a specific 6 MHz channel from the broadband input spectrum under control of the frequency synthesizer 1213 and presents it at an intermediate frequency to the digital communications receiver section 1203.

The digital receiver 1203 includes a low-pass filter, a demodulator (e.g., 64 QAM), and forward error correction circuitry. A clock circuit provides synchronization for the digital output of the demodulator, despreader, and the forward error correction circuitry.

A control interface provides appropriate control signals to the elements of the digital receiver 1203 in response to instructions from the transport interface module (TIM) controller 1210. The digital receiver processes signals selected from one of the RF channels is input to it to capture one of the digital transport streams (e.g. 27 Mbits/s payload assuming 64 QAM). The digital processor outputs the transport stream as a corrected serial baseband digital feed.

A decryption module 1207 is optional. If included, this module controls access to digital broadcast services. The decryption module 1207 comprises a decryptor and an interface to a renewable security device 1211. The renewable security device 1211 may be a card reader for accepting a TV Pass Card. An access control processor within the decryption module 1207 controls the operation of the decryptor. When properly authorized, the decryptor in module 1207 decrypts payload data within packets of a selected program in the transport stream. The composite MPEG transport multiplexed with appropriately decrypted components for the selected program is output from the TIM 1216 to the host DET's demultiplexer 827 and decompression circuitry as shown in detail in FIG. 9. The TIM controller 1210 and/or the decryption module 1207 receive instructions from the CPU 805 (FIG. 9) as to channel and program selections via the TIM/DET interface 1209.

The system memory 820 of the main portion of the DET 1218 will store a channel map for the digital broadcast programs available through the system. For each program service, the map includes information defining a logical network channel number for the program. The logical channel number is the channel the DET will display on a front panel display (not shown) or on the screen of the associated television set and is the number that the user inputs via the remote control to select the program. For each program, the map also includes RF channel information needed to tune to the RF channel carrying the program and the program number (PN) uniquely identifying the program within the multiplexed digital transport stream.

When the user selects a digital broadcast program, the microprocessor 810 in the main portion of the DET accesses the listing for that channel in the channel map and the despreading code table stored in the system memory 820. The microprocessor 810 supplies a message containing the RF channel number and the frequency hopping code to the TIM controller 1210 via interface 1209. In response to the RF channel number, the TIM controller 1210 activates the frequency synthesizer 1213 to synchronize the frequency hopping code fed from the memory 820 through the microprocessor to the frequency synthesizer. The frequency synthesizer feeds the code to the despreader 1201 which in turn delivers the selected channel to the LPF in the digital receiver 1203. If the program is encrypted, the TIM uses the program number, the program association table in the packet identified by PID 0 and the program map to identify the packets carrying audio, video and data (if any) for the program. If authorized to receive the program as indicated via the renewable security device 1211, the decryption module 1207 uses a decryption key from its memory or from the renewable security device 1211 to descramble the information in the payloads of the packets of the selected program. As a result, the TIM 1216 passes digital signals from the RF channel through the interface to the MPEG system demultiplexer 827 in the main portion of the DET wherein at least the information for the selected program is now in unencrypted form.

The MPEG demultiplexer 827 supplies information from the PID 0 packet, i.e. the program association table to the CPU 805. The microprocessor 810 uses the program number (PN) from the channel map stored in system memory 820 to identify the PID value for the correct program map from the program association table. The CPU 805 supplies that PID value to the MPEG demultiplexer 827. When the MPEG demultiplexer 827 receives a packet containing that PID, it supplies information from the packet identified by the PID (the program map) to the CPU. From the program map, the CPU identifies the PID values for the video and audio for the program and instructs the demultiplexer 827 to supply those packets to the respective MPEG decoders 829, 831 to begin MPEG decoding of the selected program for presentation to the user via the associated television set.

A frequency agile QPSK transmitter 1215 relays upstream signaling received from the TIM/DET interface and TIM controller to the upstream up converter/spread spectrum generator 1217 which is under the control of frequency synthesizer 1219 and TIM controller 1210. The signals from the TIM controller are processed in the MAC/Crypto Controller 1225 which performs appropriate medic access control, i.e., access allocation and protocol conversion. A transmitter 1221 transmits the spread spectrum signal to the antenna 1223.

Figure 11:
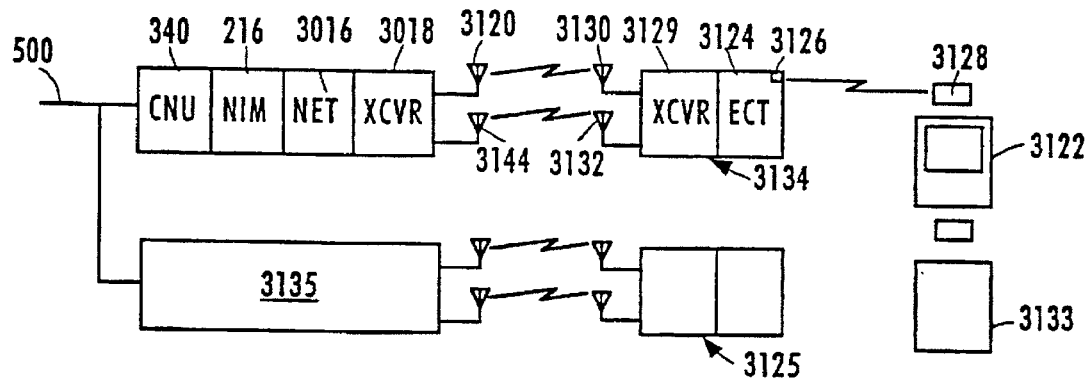
FIG. 11 illustrates yet another embodiment of implementation of the invention utilizing the type of network illustrated in FIG. 3.

Referring to FIG. 11 there is shown a block diagram of yet another embodiment of the invention. According to this embodiment spread spectrum wireless distribution is utilized within a premise to provide the unique on premise use advantages as described hereinbefore in detail in connection with the embodiment of FIG. 8. In the embodiment of FIG. 11 the program signal transmitted by spread spectrum on the premise constitutes the signal selected by the viewer rather than multiple program signals which are subject to further selection at the set top. This permits the use of smaller and less complex TV set top boxes or modules. The user premise interface and distribution equipment may be concentrated at a convenient locale proximate the cable entrance to the premise, such as in the basement or a utility room. As in the preceding embodiment of FIG. 8, the set top box transmits an upstream signal for control purposes.

Referring to FIG. 11, there is shown a drop line 500, such as the drop line of the same number previously described in connection with FIG. 8 and also shown in FIG. 3. The drop line 500 is connected through a CNU 340 as described with respect to FIG. 3. The CNU is connected to a Network Interface Module (NIM) 502 which interfaces to a Network Entertainment Terminal (NET) 3016. The NET is generally similar to the Digital Entertainment Terminal (DET) of FIG. 9 but contains certain modifications to be described. The Network Entertainment Terminal is connected to provide an input to a spread spectrum transceiver 3018 and antenna 3120. According to this embodiment of the invention the signal transmitted from the antenna 3120 is a CDMA spread spectrum signal carrying the program selection made by the user of the television set 3122.

The television set 3122 is provided with an Entertainment Control Terminal (ECT) 3124 which may include an IR remote control unit 3126. The IR remote control unit 3126 in turn may be controlled by a conventional IR remote controller 3128 for selecting the entertainment desired by the user. The Entertainment Control Terminal is connected to the spread spectrum transponder 3129 having receive and transmit antennas 3130 and 3132, respectively. As will be understood by those skilled in the art a common antenna may be used for transmit and receive with either of the transponders 3018 and 3129.

Figure 12:
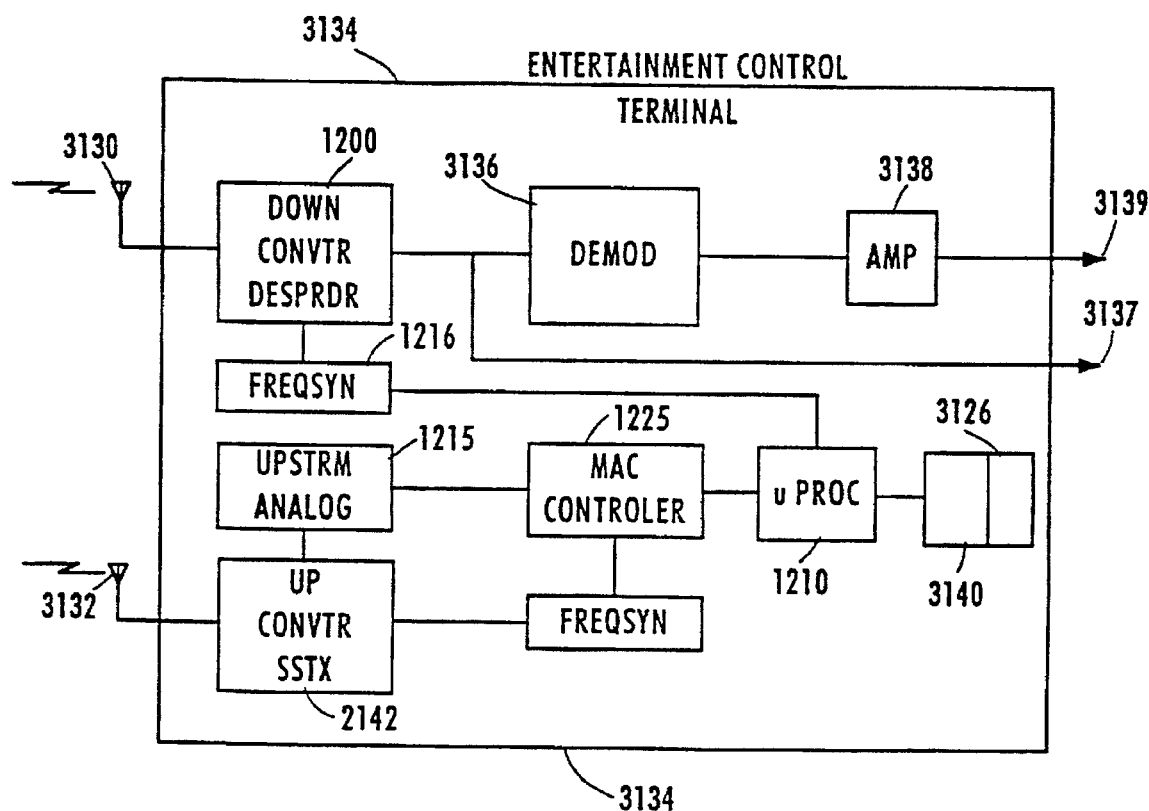
FIG. 12 illustrates a set top box or module which may be used with the embodiment of FIG. 11.

FIG. 12 depicts the combined Entertainment Control Terminal 3124 and transceiver 3129, which may be housed in a unitary container here indicated as 3134 which forms the television set top box or module. The integrated Entertainment Control Terminal or set top module 3134 includes in the transceiver portion a down converter despreader and frequency synthesizer 1200 and 1216, respectively, which are the same type as shown and described in connection with FIG. 10. The incoming signal received by the antenna 3130 comprises the entertainment signal selected by the user. This signal is in the form of baseband NTSC modulation on an RF carrier, which in turn is transmitted by CDMA code in the spread spectrum signal. The output of the down converter despreader 1200 comprises an NTSC modulated RF carrier. This may be fed to a demodulator 3136 or may be delivered directly to the television set antenna terminals typically on Channel 3 as indicated at 3137. The NTSC signal which results from the demodulation may be fed to an amplifier 3138 and thence at 3139 to the baseband input terminals of the television set 3122. The frequency synthesizer 1216 is connected to a microprocessor or controller 1210 similar to the controller of the same reference number seen in FIG. 10.

The Entertainment Control Terminal portion of the set top box or module 3134 includes an upstream control signal section generally similar to that seen in the lower portion of FIG. 10. Thus, a frequency agile QPSK transmitter 1215 receives an input control signal from the IR controller 3126 via a protocol translating interface 3140, the microprocessor 1210 and MAC/crypto controller 1225. The upstream control signal from the QPSK transmitter is transmitted by the up converter transmitter 2142 which contains the up converter spread spectrum generator 1217 and transmitter 1221 illustrated and described in FIG. 10. This spread spectrum signal is transmitted via the antenna 3132 to the receive antenna 3144 of the transponder 3018 in FIG. 11.

Figure 13:
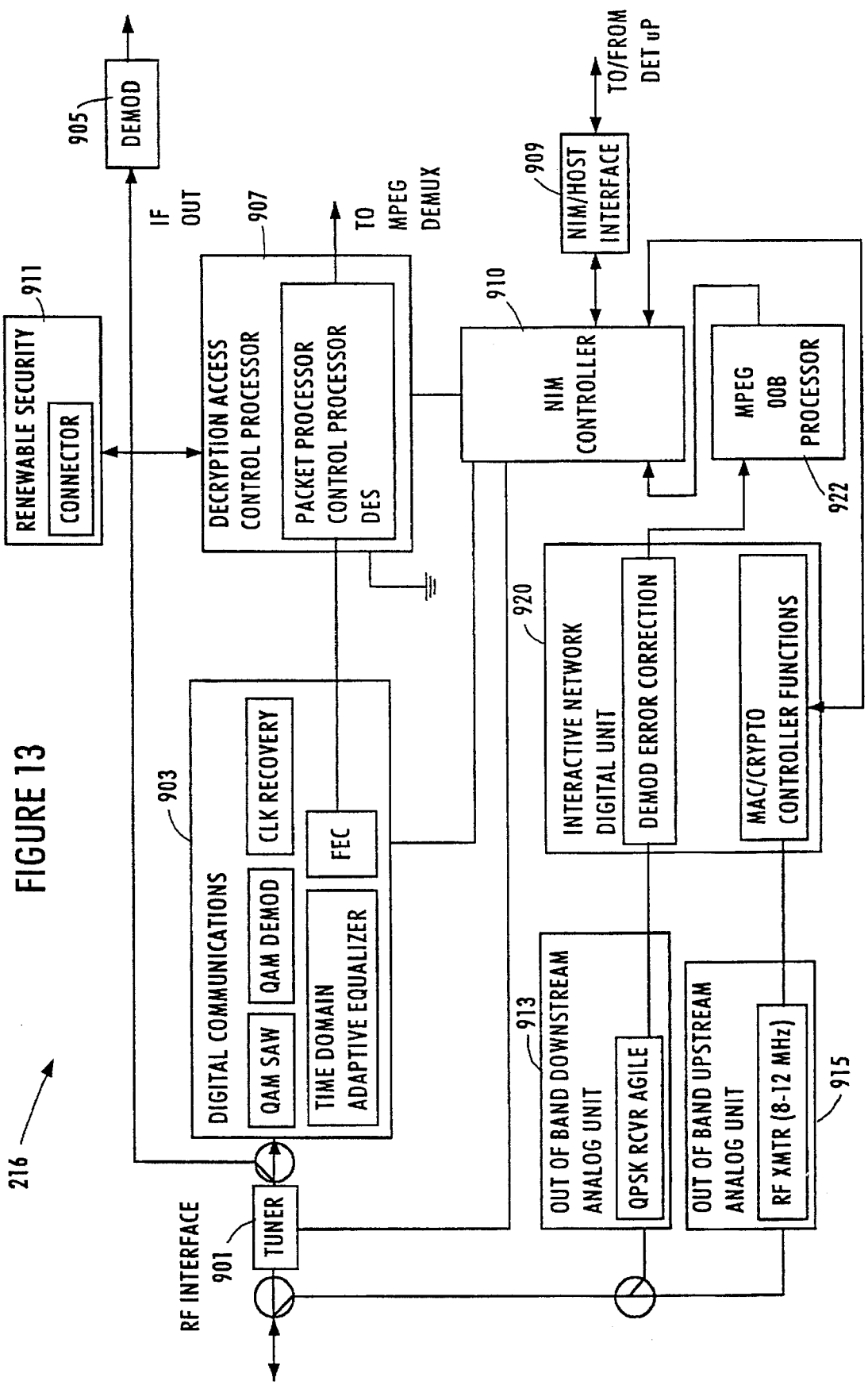
FIG. 13 depicts a Network Interface Module (NIM) for interfacing with the Network Entertainment Terminal (NET) as shown in FIG. 11.

FIG. 13 depicts a Network Interface Module (NIM) 502 for interfacing with the NET 3016 as shown in FIG. 11. The structure illustrated is based in part on the preference for the QAM modulation techniques for the digital video (broad band) signals and the QPSK modulation technique for the signaling data (narrow band) signals in the disclosed network. The input to the NIM is a broad band RF signal provided from the coaxial distribution drop. The tuner 901 selects a specific 6 MHz channel from the broad band input spectrum and presents it at an intermediate frequency to the digital communications section 903. An additional IF output port feeds signal to analog video/audio demodulator 905. Although illustrated as part of the NIM, the demodulator could also be provided as an element of the NET.

The QAM demodulator block performs adaptive equalization, demodulation and forward error correction on signals in a specified one of the digital channel slots from the tuned RF channel and outputs a corrected serial base band digital feed. The decryption processor, if used, decrypts packets identified by selected MPEG PIDs, as directed by the NET microprocessor, via the host interface 909 and the NIM controller 910. The composite MPEG transport multiplex with appropriately decrypted components is output from the NIM 502 to the host NET's demultiplex and decompression circuitry in the digital audio/video processor 2125 as shown in detail in FIG. 14.

Figure 14:
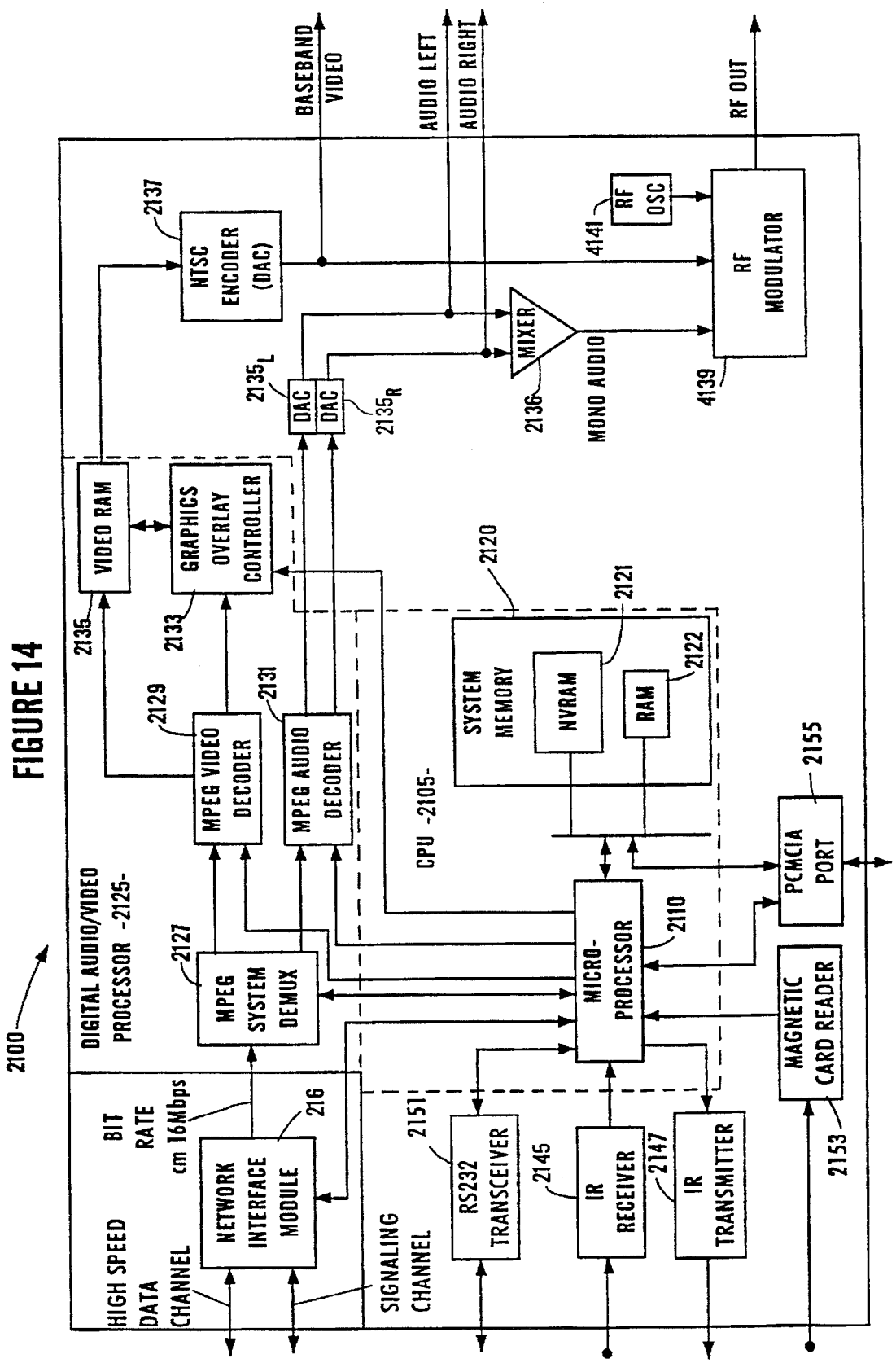
FIG. 14 depicts details of a Network Entertainment Terminal (NET) which may be used in the embodiment of the invention illustrated in FIG. 11.

In the illustrated preferred embodiment, communication between the host microprocessor 2110 in FIG. 14 and the NIM 216 in FIGS. 13 and 14 is via a dual port memory connected as the NIM host interface 909. The shared memory provides mailboxes and buffer regions which are used to transfer messages and commands between the host microprocessor and the NIM 216. Messages passing through this link include interactive traffic to the level one and level 2 gateways, tuner control commands, specification of appropriate PIDs for decryption, general housekeeping data, and the like.

The RF tuner 901 translates the desired channel, containing either digital or analog information, to a 43.75 MHz IF signal. The IF signal contains either digital or analog information. The tuner 901 utilizes a dual conversion technique with synthesized local oscillators, and has an input tuning range of 50 MHz to 860 MHz.

The 64 QAM demodulator comprises three submodules: DMAU, DMDU, and FEC. This module demodulates the QAM signal to digital form, and performs forward error correction (FEC) decoding, and it provides a baseband digital signal to the Decrypter Module. The DMAU contains the SAW filter, the QAM demodulator, carrier and clock recovery loop components and AGC control signal generation for the tuner 901. The DMDU contains an adaptive equalizer, AGC control signal generation for the DMAU, and error generation functions for the clock and carrier recovery loop. The FEC module executes concatenated Viterbi (Trellis) and Reed Solomon error correcting functions.

The decrypter module 907 receives the baseband digital data information stream from the demodulator and control/authorization information from the NIM controller 910.

When authorized, this module 907 decrypts the package identified by appropriate PIDs in the data stream. The high speed data containing decrypted packets is then passed out of the NIM to the host terminal. This module employs a DES type decryption algorithm and a key hierarchy to provide access control and decryption. The specific algorithms may be modified through the use of a TV pass card which is inserted in the renewable security slot 911.

The signaling interface between the NIM 216 and the local loop coax drop comprises a 64 QAM in-band transport multiplex receiver and the frequency agile QPSK out-of-band receiver 913. A frequency agile QPSK transmitter 915 relays the upstream signal over an assigned default channel and/or dynamically assigned upstream signaling channels, typically in the 8–12 MHz band on the coaxial drop. The out-of-band receiver 913 monitors QPSK signals on an assigned down stream default signaling channel. Down stream signals on the default down stream signaling channel are demodulated by the receiver 913 and forwarded to the interactive network digital unit 920 for error correction. The MPEG encoded out-of-band signals are then output to an MPEG out-of-band (OOB) processor 922. If the received MPEG encoded signals have a PID value corresponding to the NIM network address or the NET address, the MPEG OOB processor 922 performs MPEG processing to recover the signaling data from the MPEG packets, and outputs the data to the NIM controller 910. If the data from the MPEG processor 922 is DET signaling data, the NIM controller 910 supplies the signaling data to the NET processor via the NIM/Host Interface 909; if, however, the data from the MPEG processor 922 is NIM signaling data, then the NIM controller 910 processes the NIM signaling data accordingly. It will be understood that either or both in-band and out-of-band down stream signaling may be utilized.

In this embodiment of the invention, the down stream input to the transponder or transceiver 3018 in FIG. 11 is in the form of the program signal modulated onto an RF carrier. This signal is obtained from a modulator 4139 connected to an RF oscillator carrier generator 4141 and the NTSC encoder 2137 and audio mixer 2136 shown in FIG. 14. This signal is in turn broadcast by the transponder 3018 as a CDMA spread spectrum signal for reception and processing by one or more transponders associated with television sets on the premise. FIG. 11 shows two such television sets 3122 and 3133 each having its own set top box or module 3124 and 3125. Television sets intended to operator independently for simultaneous reception of different programs are provided with duplicate NIM, NET, and transponder units as shown by way of example at 3135.

It will thus be appreciated that the embodiment of the invention illustrated in FIGS. 11–14 provides a unique coupling between a user control terminal associated with a television set and a communication link, such as a coaxial drop cord. The drop cord is connected to a communication network for selectively providing broadband communication links via a gateway for connecting selected information provider systems to user terminals in response to the user terminals transmitting control signals upstream in response to user inputs. The user control or entertainment control terminal is coupled to the communication link through a wireless coupling. The coupling includes a pair of transponders or transceivers located at the premise for receiving and transmitting spread spectrum radio frequency signals. A first transponder associated with the user TV set translates into radio frequency code division multiple access (CDMA) signals and transmits by RF radiation, control signals which are received from the user control terminal.

The same transponder receives and translates from spread spectrum radio frequency signals and delivers to the user control terminal broadband and control signals which it receives. The other or second transponder of the pair receives and transmits CDMA spread spectrum radio frequency signals. This transponder transmits broadband and control signals received from the communication link and receives and translates from spread spectrum radio frequency signals and delivers to the communication link control signals received from the first transponder.

The Network Entertainment Terminal (NIM) includes a demultiplexer which separates from the broadband digital information a signal selected by the entertainment control terminal and delivers the separated signal to the second transponder. The Network Entertainment Terminal also includes a decoder which decodes the broadband digital information. A tuner is provided to select from the broadband digital information on the communication link a signal which is connected to the demultiplexer. The signal delivered to the second transponder includes a radio frequency carrier modulated with the signal selected by the set top entertainment terminal, and this modulated signal is delivered to the second transponder. The modulating signal comprises an NTSC signal. The entertainment control terminal or set top box for the TV set includes a demodulator for demodulating or despreading the spread spectrum signal to provide to the television set an RF carrier including the NTSC signal for processing in the television set in the conventional manner. Alternatively, the set top module may provide a baseband signal to the TV set baseband terminals. The entertainment control terminal in the set top box also includes a control signal processor which is responsive to the selection of the user for providing to the first transponder a signal to modulate the spread spectrum signal transmitted by the first transponder to the second transponder. While any type of CDMA spread spectrum may be utilized frequency hopping spread spectrum is preferred.

Figure 15:
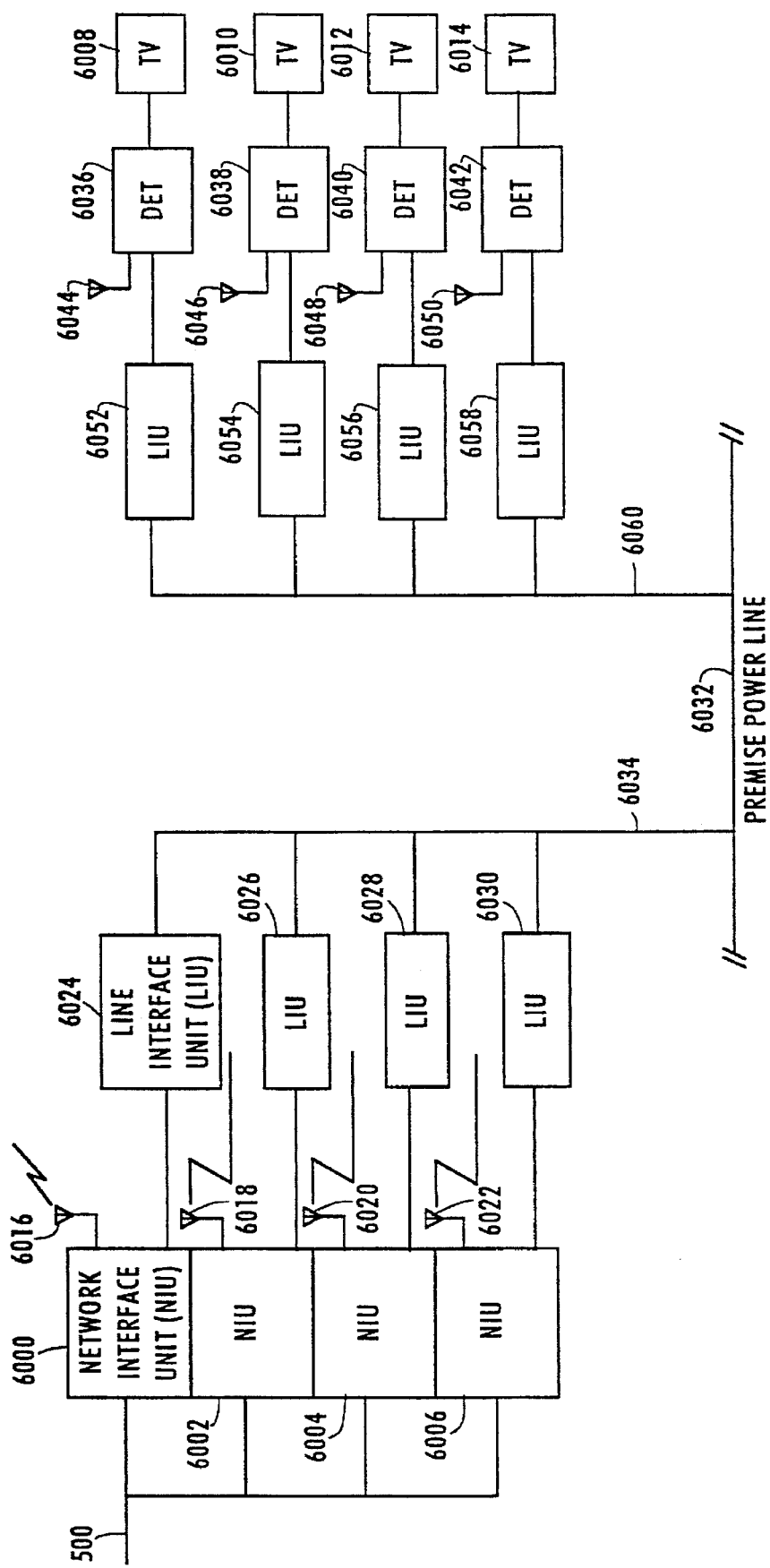
FIG. 15 illustrates yet another embodiment of the implementation of the invention utilizing the type of network illustrated in FIG. 3.

Referring to FIG. 15 there is shown a block diagram of yet another embodiment of the invention. According to this embodiment wireless distribution is utilized within a premise to distribute the broad band signal to multiple user terminals such as television sets. Spread spectrum wireless distribution is preferably utilized to minimize interference. As a further step in reducing interference and background noise generally this embodiment of the invention utilizes power line carrier distribution of the downstream and upstream control signals. This approach permits wireless distribution using simple transmitters and receivers rather than transceivers. FIG. 15 shows a block diagram of such an arrangement in an exemplary premise according to this embodiment of the invention.

Referring to FIG. 15 there is shown a drop line 500, such as the dropline of the same number previously described in the connection with FIGS. 8, 3 and 11. The dropline comprises the network communication link to the premise. On the premise, the dropline is connected to a number of network interface units 6000, 6002, 6004 and 6006 which is equal in number to the number of premise terminals, such as television sets 6008, 6010, 6012 and 6014. The network interface units include radio frequency transmitters and antennas 6016–6022. The network interface units may be similar to the corresponding units in the embodiments of FIGS. 8 and 11 with respect to the downstream transmission of the broad band signal. However, the two-way 16 kbits/s control channel in this embodiment of the invention is transported by a power line carrier.

Each network interface unit (NIU) is provided with a line interface unit (LIU) 6024–6030 connected to the premise power line 6032. The line interface unit is preferably housed with the network interface unit and the connection 6034 to the premise power line 6032 is preferably made via the power supply connection for the network interface unit as is presently described. Each network interface unit has a corresponding digital entertainment terminal (DET) 6036–6042 which includes a receiver and receive antenna 6044–6050. The digital entertainment terminals may be of the type described in connection with FIG. 8 and FIG. 11. However, in this embodiment of the invention the wireless processing portion of the digital entertainment terminal requires only a radio frequency receiver rather than a transceiver as is required in the preceding embodiments of the invention. The receivers handle the broad band downstream signal.

The two-way control channel is carried by power line carrier via line interface units 6052–6058 connected to the digital entertainment terminals and the premise power line 6032. As with the network interface units, it is preferable to house the line interface units with the digital entertainment terminals so that the power line connection 6060 may be made via the power connection for the digital entertainment terminal. The digital entertainment terminals transmit data signals to the Level I Gateway via the 16 kbits/s control channel and the X.25 packet switched data network being used, such as, for example, those shown in the networks of FIGS. 1–3.

As previously described, in a typical scenario, the user turns on the digital entertainment terminal, and in response to data signals from the Level I Gateway, the terminal displays an initial selection menu. The subscriber then inputs a selection, and in response to an appropriate data signal from the digital entertainment terminal, the Level I Gateway instructs the various network components to set up a virtual circuit to the Level II Gateway of a selected VIP for signaling purposes and a direct downstream path from the VIP's server through the digital cross-connect switch for video transmission. The video is distributed on the premise via the wireless signal which is preferably spread spectrum as previously described in order to avoid interference.

The digital entertainment terminal can transmit control signaling upstream in the network via the X.25 data network and can receive signaling information, such as control data and text/graphics, downstream in the network through the same path to the network interface units. At the network interface unit the path of the broad band and narrow band signals is bifurcated with the broad band signals being transmitted by wireless and the narrow band signals transmitted via the power line carrier connection. The narrow band transport may also carry voice and narrow band data services. Each digital entertainment terminal includes a remote control and/or keypad to receive various selection signals from the user. The actual transmission of data signals upstream may occur in response to a polling of the digital entertainment terminals as described in connection with the network of FIG. 3. Each digital entertainment terminal may transmit data on a different carrier frequency, in which case the network controller knows which DET sent particular data based on the received frequency channel. Alternatively, for interactive services, the DET may transmit a unique identification code with the upstream message.

Figure 16:
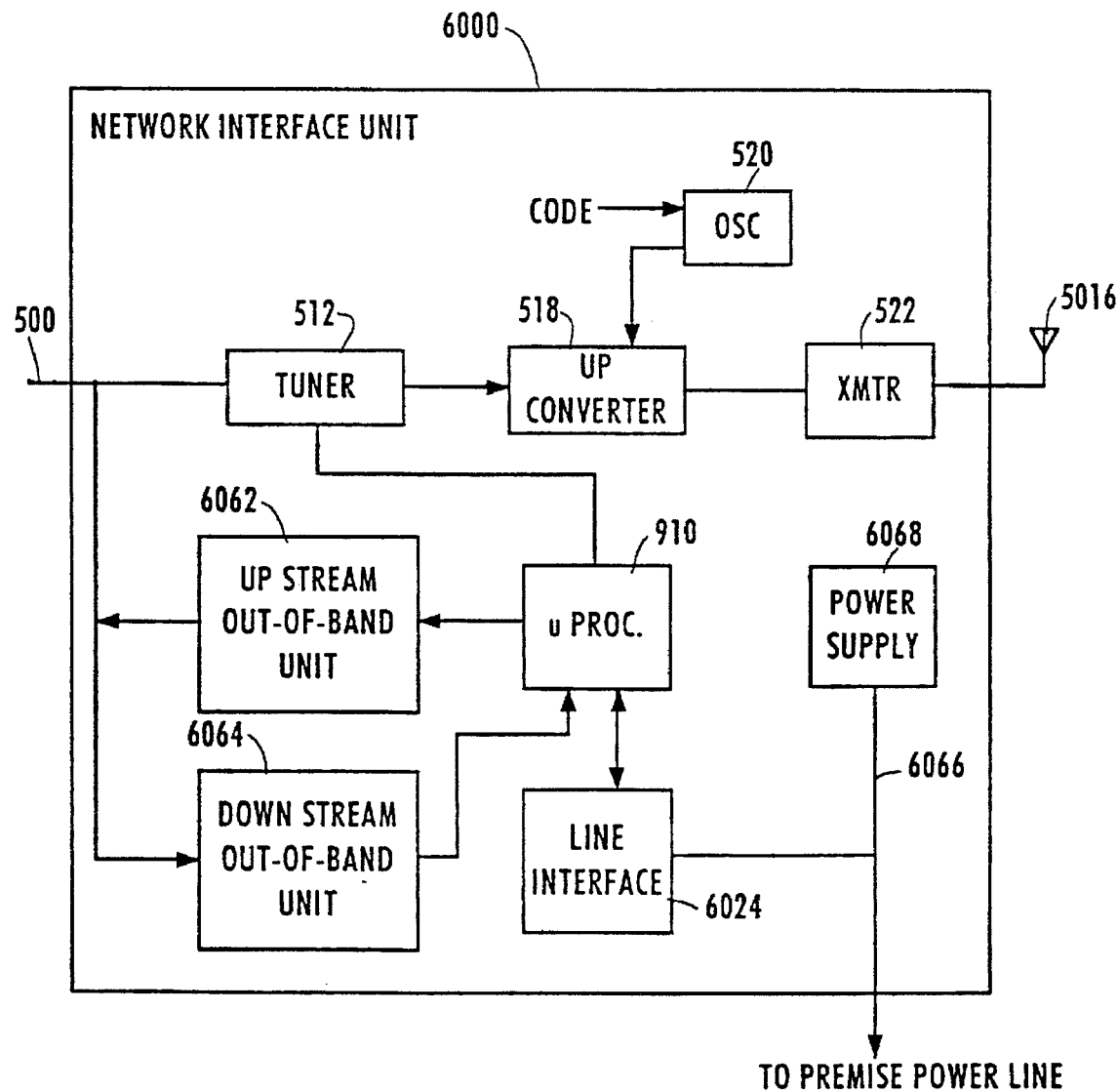
FIG. 16 depicts a Network Interface Unit (NIU) for interfacing with the network.

FIG. 16 shows details of a typical network interface unit such as the units 6000–6006 in FIG. 15. Thus, the network interface unit 6000 includes the same broad band distribution elements as described in connection with the embodiment of FIG. 8. The drop cable connection 500 is made through a network interface unit 6000 preferably located proximate the entry of the cable 500 to the premise. The network interface unit includes an analog frequency tuner 512 controlled by a microprocessor 910 to selectively receive the radio frequency channel signals, including those channels carrying digital information. The tuner 512 selects a 6 MHz channel or slot which contains four or more digitized and compressed video program and/or control channels. The tuner will tune in all channel frequencies carried by the network, including those used for the analog broadcast services.

The output of the tuner 512 is fed to a frequency hopping code division multiple access (CDMA) spread spectrum transmitter comprising spread spectrum generator and up converter 518 which is connected to a local oscillator or synthesizer 520. The oscillator operates in a frequency range to achieve the desired degree of up conversion. The output of the spread spectrum generator or up converter 518 is then fed to a transmitter amplifier 522 and to the antenna 5016. The out-of-band two-way signaling channel is split off from the network connection 500 and connected to upstream and downstream out-of-band processing units 6062 and 6064 which may be the same as the upstream and downstream processors 913, 915, 920 and 922 in FIG. 13. The upstream unit 6062 relays the upstream signal over an assigned default channel and/or dynamically assigned upstream signaling channels, typically in the 8–12 MHz band on the coaxial drop.

The downstream unit 6064 monitors QPSK signals on an assigned downstream default signaling channel. Downstream signals on the default downstream signaling channel are demodulated, error corrected, MPEG processed, and fed to the controller or microprocessor 910. The controller 910 supplies the signaling data to the corresponding digital entertainment terminal over the premise power line 6032 in FIG. 15 via the line interface module 6024. The line interface module 6024 is a conventional power line carrier module which generates the radio frequency carrier which is modulated by the control data signal from the microprocessor or controller 910. The connection to the power line is preferably made within the housing of the network interface unit via the power line connection 6066 for the power supply 6068 for the network interface unit 6000. In this way it is possible to avoid any necessity for providing external wiring on the premise.

Figure 17:
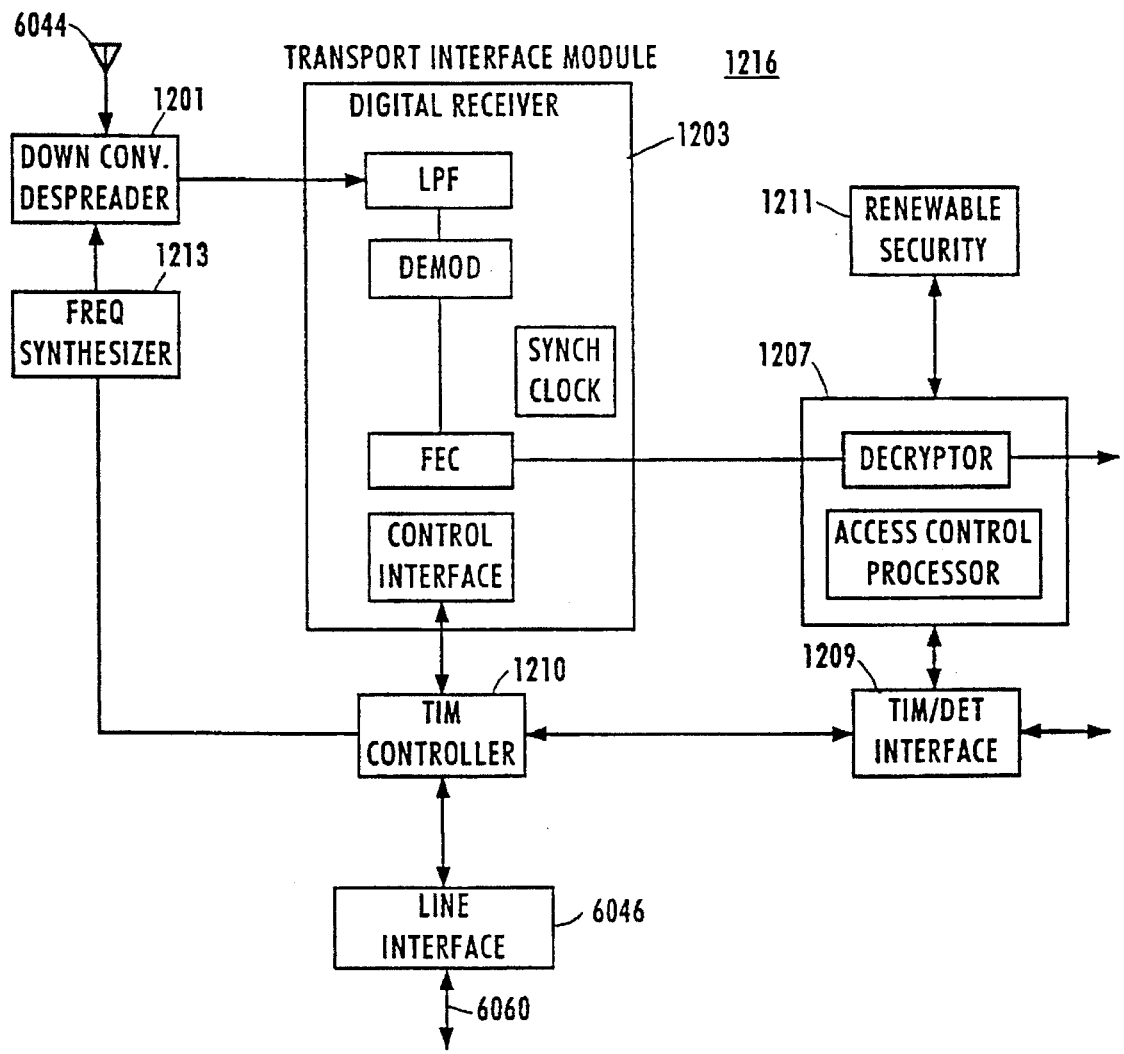
FIG. 17 depicts details of the wireless and control signal interface of a network entertainment terminal which may be used in the embodiment of the invention illustrated in FIG. 15.

FIG. 17 shows the details of a digital entertainment terminal such as the DET 6036 in FIG. 15. The terminal is substantially the same as that illustrate in FIG. 10 with the exception of the transport of the two-way control signals. It will be understood that the digital entertainment terminal in FIG. 15 includes, in addition to a transport interface module 1213 shown in FIG. 17, a digital audio/video processor such as the module 2100 in FIG. 14.

Referring to FIG. 17, the spread spectrum signal transmitted by the network interface unit 6000 is received by the antenna 6044. The despreader 1201 selects a specific 6 MHz channel from the broad band input spectrum under control of the frequency synthesizer 1213 and presents it at an intermediate frequency to the digital communications receiver section 1203. The digital receiver processes signals selected from one of the RF channels to capture one of the digital transport streams. The digital processor outputs the transport stream as a corrected serial baseband digital feed. The decryption module 1207 is optional. The TIM controller 1210 and/or the decryption module 1207 receive instructions from the CPU 805 (FIG. 9) as to channel and program selection via the TIM/DET interface 1209.

The two-way control signals to and from the TIM/DET interface are connected via the TIM controller to the line interface module 6046 and thence to a power line connection 6060. The connection 6060 preferably constitutes the power connection for the TIM and related circuitry thus avoiding the need for a separate and external wire connection to the power line. The control signals are carried by the power line to and from the line interface module 6024 and network interface unit 6000. It will be understood that the network interface units and digital entertainment terminals operate in pairs utilizing the same spread spectrum code. The difference in code between the respective line interface modules and DETs allows the multiple television terminals to tune to or select different programs according to the desire of the user of the individual television sets.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A customer premise installation for distributing on said premise from a communication network terminating link broadband digital information and two-way narrow band control signals, comprising:

plural user video terminals each connected to a collocated control terminal;

each video terminal being coupled to said terminating link through a coupling including a pair of interface units;

a first interface coupler in each pair of interface units comprising a receiver and a transmitter for respectively receiving and transmitting spread spectrum radio frequency signals, said transmitter transmitting radio frequency signals including a broadband digital information signal and said receiver receiving and translating from said spread spectrum radio frequency signals and delivering to said video terminal broadband signals;

a second interface coupler in each pair of interface units receiving and transmitting said two-way control signals including upstream signals corresponding to signals received from one of said control terminals and downstream signals corresponding to signals received from said terminating link;

said second interface coupler in each pair of interface units including a power line transporting said two-way control signals on carriers modulated by said control signals corresponding to said downstream control signals emanating from said terminating link and said upstream control signals emanating from said one control terminal.

2. An installation according to claim 1 wherein upstream control signals on said power line are responsive to downstream polling signals.

3. An installation according to claim 1 wherein each said pair of interface units is coupled to said terminating link via an interface module which includes:

a first signal selector which selects from multiple broadband signals carried by said terminating link a group of said broadband signals responsive to an upstream control signal corresponding to user input to said control terminal; and a second signal selector which selects from said group of broadband signals a signal carrying the video content responsive to an upstream control signal corresponding to user input to said control terminal.

4. An installation according to claim 3 wherein one of said selectors is a frequency selector.

5. An installation according to claim 3 wherein one of said selectors is a CDMA selector.

6. An installation according to claim 1 wherein said spread spectrum signals are frequency hopped spread spectrum.

7. In a system comprising:

a communication network selectively providing broadband communications links;

a plurality of information service provider systems connected to the network for transmitting broadband digital information via communication links through the network;

a gateway for connecting selected information provider systems to user terminals responsive to user terminals transmitting control signals upstream through the network in response to user inputs;

wherein said user terminals include a control terminal for coupling to a communication link transporting from said network said broadband digital information and two-way control signaling;

said control terminal being coupled to said communication link transporting said broadband digital information and two-way control signaling through a coupling including:

a first interface unit located at the premise including a radio frequency transmitter and a radio frequency receiver for transmitting and receiving spread spectrum radio frequency signals carrying broadband digital information responsive to signals received from said control terminal, and receiving and translating from spread spectrum radio frequency signals and delivering to said control terminal a broadband signal;

a second interface unit located at the premise receiving and transmitting two-way control signals including upstream signals corresponding to signals received from said control terminal and downstream signals corresponding to signals received from said terminating link;

said second interface unit including a power line transporting said two-way control signals on carriers modulated by control signals corresponding to said downstream control signals emanating from said terminating link and said upstream control signals emanating from said control terminal.

8. A system according to claim 7 wherein said coupling includes a demultiplexer which separates from said broadband digital information a signal selected by said control terminal and delivers said separated signal to one of said user terminals.

9. A system according to claim 8 wherein the broadband digital information is transported in a compressed encoded form and said coupling includes a decoder which decodes said broadband digital information.

10. A system according to claim 7 wherein the broadband digital information includes multiple compressed multiplexed digital channels.

11. A system according to claim 7 wherein upstream control signals on said power line are responsive to downstream polling signals.

12. A system according to claim 7 wherein each pair of first and second interface units is coupled to said terminating link via an interface module which includes:

a first signal selector which selects from multiple broadband signals carried by said terminating link a group of said broadband signals responsive to an upstream control signal corresponding to user input to said control terminal; and a second signal selector which selects from said group of broadband signals a signal carrying the video content responsive to an upstream control signal corresponding to user input to said control terminal.

13. A system according to claim 12 wherein one of said selectors is a frequency selector.

14. A system according to claim 12 wherein one of said selectors is a CDMA selector.

15. A system according to claim 7 wherein said spread spectrum signals are frequency hopped spread spectrum signals.

16. A method of providing on premise distribution of an interactive communication service establishing multiple communication links between selected ones of a plurality of available information service providers and control terminals for multiple video terminals on a premise, each said communication link providing downstream transport of broadband, digital information to the control terminals, comprising the steps of:

multiplexing broadband digital information, including video and audio, and control signals;

establishing on premise spread spectrum radio frequency links to said control terminals, said links transporting selected broadband information;

converting multiple selected broadband digital information delivered to said on premise radio frequency links to analog video and audio signals delivered to ones of said video terminals;

using CDMA codes unique to said spread spectrum radio frequency links and control terminals;

establishing on premise power line radio frequency links to said control terminals, said power line radio frequency links transporting two way control signaling to and from said communication link.

17. A customer premise installation for distributing on said premise from a communication network terminating link broadband digital information and two-way narrow band control signals, comprising:

plural user video terminals each connected to a collocated control terminal;

each video terminal being coupled to said terminating link through a coupling including a pair of interface units for each of said video terminals;

a first interface coupler in each pair of interface units comprising a receiver and a transmitter for respectively receiving and transmitting radio frequency signals, said transmitter transmitting radio frequency signals including a broadband digital information signal and said receiver receiving said radio frequency signals and translating from said radio frequency signals and delivering to said video terminal broadband signals;

a second interface coupler in each pair of interface units receiving and transmitting said two-way control signals including upstream signals corresponding to signals received from one of said control terminals and downstream signals corresponding to signals received from said terminating link;

said second interface coupler in each pair of interface units including a power line transporting said two-way control signals on carriers modulated by control signals corresponding to said downstream control signals emanating from said terminating link and upstream control signals emanating from said one control terminal.

18. An installation according to claim 17 wherein upstream control signals on said power line are responsive to downstream polling signals.

19. An installation according to claim 17 wherein each said pair of interface units is coupled to said terminating link via an interface module which includes:

a first signal selector which selects from multiple broadband signals carried by said terminating link a group of said broadband signals responsive to an upstream control signal corresponding to user input to said control terminal; and a second signal selector which selects from said group of broadband signals a signal carrying the video content responsive to an upstream control signal corresponding to user input to said control terminal.

20. An installation according to claim 19 wherein one of said selectors is a frequency selector.

21. An installation according to claim 19 wherein one of said selectors is a CDMA selector.

* * * * *